United States Patent
Carlson et al.

(10) Patent No.: US 11,900,208 B2
(45) Date of Patent: Feb. 13, 2024

(54) SCANNABLE CODE HAVING A UNIQUE IDENTIFIER

(71) Applicant: INGAMO, LLC, Grand Rapids, MI (US)

(72) Inventors: Charles John Edwin Carlson, Lansing, MI (US); Matthew James Tisdale, St. Johns, MI (US); Austin Brown, Littleton, CO (US)

(73) Assignee: Ingamo, LLC, Grand Rapids, MI (US)

( * ) Notice: Subject to any disclaimer, the term of this patent is extended or adjusted under 35 U.S.C. 154(b) by 28 days.

(21) Appl. No.: 17/715,114

(22) Filed: Apr. 7, 2022

(65) Prior Publication Data
US 2022/0327303 A1    Oct. 13, 2022

Related U.S. Application Data

(60) Provisional application No. 63/224,981, filed on Jul. 23, 2021, provisional application No. 63/171,848, filed on Apr. 7, 2021.

(51) Int. Cl.
*G06K 7/14* (2006.01)
*G06K 1/12* (2006.01)
*G06K 19/04* (2006.01)
*G06K 7/10* (2006.01)

(52) U.S. Cl.
CPC .......... *G06K 7/1417* (2013.01); *G06K 1/121* (2013.01); *G06K 7/10297* (2013.01); *G06K 7/1434* (2013.01); *G06K 19/041* (2013.01)

(58) Field of Classification Search
CPC .. G06K 7/1417; G06K 1/121; G06K 7/10297; G06K 7/1434

USPC .................................................. 235/462.01
See application file for complete search history.

(56) References Cited

U.S. PATENT DOCUMENTS

| | | | |
|---|---|---|---|
| 5,691,527 A | 11/1997 | Hara et al. | |
| 5,726,435 A | 3/1998 | Hara et al. | |
| 7,032,823 B2 | 4/2006 | Nojiri | |
| 2013/0018726 A1 | 1/2013 | Tonescu et al. | |
| 2017/0076752 A1 | 3/2017 | Steward | |
| 2017/0200193 A1* | 7/2017 | Bigley | H04L 51/10 |
| 2018/0020354 A1* | 1/2018 | Felt | H04W 12/06 |
| 2018/0039978 A1 | 2/2018 | Schimke | |
| 2019/0001732 A1* | 1/2019 | Ongsitco | G06K 19/0727 |
| 2019/0303634 A1 | 10/2019 | Broselow | |
| 2020/0021553 A1 | 1/2020 | Pilarz | |

(Continued)

FOREIGN PATENT DOCUMENTS

| | | |
|---|---|---|
| JP | 3716527 B2 | 11/2005 |
| JP | 3726395 B2 | 12/2005 |

(Continued)

OTHER PUBLICATIONS

"QR Hosting ABCs"., Idintity.com, Feb. 4, 2013, 1 page, www.idintity.com/hosting_abcs.aspx.

*Primary Examiner* — Ahshik Kim
(74) *Attorney, Agent, or Firm* — McGarry Bair PC

(57) ABSTRACT

A greeting card having a scannable code with a unique identifier representative of a unique location on a computer network with the unique location having a first response with a first set of data. The scannable code can be scanned, a first time, to display a first response having a first set of data. The first response can be replaced by a second response having a second set of data.

20 Claims, 19 Drawing Sheets

(56) References Cited

U.S. PATENT DOCUMENTS

| | | |
|---|---|---|
| 2020/0184516 A1 | 6/2020 | Bigley |
| 2020/0219140 A1* | 7/2020 | Frankel |
| 2021/0248667 A1* | 8/2021 | Schimke .............. G06Q 20/352 |
| 2021/0272099 A1* | 9/2021 | Frye .................... G06Q 20/354 |

FOREIGN PATENT DOCUMENTS

| | | |
|---|---|---|
| JP | 3843595 B2 | 11/2006 |
| KR | 20130087173 | 8/2013 |

* cited by examiner

SCANNABLE CODE HAVING A UNIQUE IDENTIFIER

CROSS-REFERENCE TO RELATED APPLICATIONS

This application claims benefit of U.S. Provisional Patent Application 63/171,848 filed Apr. 7, 2021, and U.S. Provisional Patent Application 63/224,981 filed Jul. 23, 2021, the contents of which are incorporated herein by reference.

TECHNICAL FIELD

The present invention relates generally to a scannable code, and more specifically to a scannable code having a unique identifier representative of a unique location on a computer network.

BACKGROUND

A scannable code is any device that can be scanned by a scanner to transfer data to the scanner or an interface communicatively coupled to the scanner. On exemplary form a scannable code is a Quick-Response (QR) code, which is a two-dimensional bar code consisting of an array of nominally square modules in an overall square pattern capable of storing substantial amounts of data. A computing device such as a smartphone, configured with an imaging device and a QR reader (e.g., a scanner), reads and extracts data from patterns present in both horizontal and vertical components of the scannable code. Data encoded in the scannable code can be text, URL, or other data. Originally designed for industrial uses, QR codes have become common in consumer advertising. Commonly, a QR code is encoded with a Uniform Resource Locator (URL) which will direct a user to a webpage once scanned by a computing device such as a smartphone. QR codes storing URLs commonly appear in magazines, on signs, on business cards or other objects about which users might need information. Recently, many web based services for generating QR codes with user defined encoded data have become available to the public. Users may choose the data encoded in the QR code such as a URL and the design of the QR code itself. Once the QR code is generated, the data encoded in the code cannot be changed, preventing users from changing the content linked to the QR code. This statement holds true for all scannable codes. Once, a scannable code is generated (e.g., the physical device constituting the scannable code is generated), the content linked to that scannable code cannot be changed.

FIG. 1 is an illustration of a prior art scannable code. As a non-limiting example, a prior art QR code 1 consisting of an array of black and white square modules capable of storing data such as a URL. As mentioned previously, the URL is saved or held onto the prior art QR code 1 when the prior art QR code 1 is generated. The URL cannot be changed after the prior art QR code 1 is generated.

FIG. 2 is an illustration of a prior art method 10 of using a smartphone 12 to scan 16 and decode 18 a printed scannable code 14 (e.g., the prior art QR code 1 of FIG. 1) printed on a medium to access a webpage 20 corresponding to a URL encoded in the printed scannable code 14. The URL code can include a set of loadable data. The URL is encoded on the scannable code 14 at the time of generation of the printed scannable code 14. When the printed scannable code 14 is scanned, the set of loadable data is displayed. The set of loadable data must be assigned to the URL before the URL is encoded on the printed scannable code 14. As such, the printed scannable code 14 can be defined as a printed scannable code 14 having access to a set of pre-existing loadable data.

FIG. 3 is a schematic illustration of a method 50 of assigning content to the scannable code 1 of FIG. 1. The content can be, for example, the set of loadable data. The method 50 can start by assigning or entering the set of loadable data, at 52. The set of loadable data that assigned will be what is displayed when the scannable code 1 is scanned. The set of loadable data can be assigned to a corresponding URL, as described herein. The assigning can be done by a user. For example, a user could upload the set of loadable data to the URL. The scannable code 1 can then be generated, at 54. The generation of the scannable code 1 can be a physical printing of the scannable code 1 or a computer generation of the scannable code 1. The URL can also be assigned to the scannable code 1, at 56. As the set of loadable data is assigned to the URL before the generation of the scannable code 1, the set of loadable data can be defined as a set of predetermined or predefined loadable data. In other words, the set of loadable data is not changed after the generation of the scannable code 1. A user can then read the scannable code 1 to have the set of loadable data displayed on their device, at 58. The reading of the scannable code 1 can be done by scanning the scannable code with a camera (e.g., a scanner).

The use of a scannable code having preexisting data results in a non-customizable scannable code. In other words, a user or a consumer cannot where the scanner or a device concerning to the scanner is directed to when the scannable code is scanned. One such solution is to allow a consumer to create the scannable code themselves. For example, a user can utilize a kiosk to upload data that they wish to be displayed when the scannable code is scanned. The scannable code can then be generated (e.g., made) with the uploaded data. This method, however, requires additional infrastructure in order to feasible. For example, this method requires a kiosk for a user to upload data, a printer to print or create the scannable code, and a method of communication between the user and the kiosk itself (e.g., a method to upload the data). This can be very time consuming and expensive.

Another solution is to create a scannable code that directs a user or consumer to a URL when the scannable code is scanned. This URL can be changed after generation of the scannable code to redirect the user or consumer to another URL. The other URL can be used to displayed user-defined data. This method, however, still results in a scannable code that has to be redefined, which adds a layer of complexity to the consumer (e.g., they have to now upload their data to a URL that is indirectly connected to the scannable code) and the manufacture (e.g., they now have to create two or more URLs in order to have the scannable code display some form of user-defined data).

BRIEF SUMMARY

Aspects to the present disclosure are related to a greeting card comprising a scannable code having a unique identifier representative of a unique location on a computer network with the unique location having a first response with a first set of data, wherein the scannable code is configured to be scanned a first time, via a first scanner associated with a first interface, causing the first response to be displayed through the first interface, wherein the first response includes a prompt to generate a second response having a second set of data, at least partially different from the first set of data, and wherein the first response is replaced by the second response upon generation of the second response.

Another aspect of the present disclosure relates to a memento comprising a scannable code having a unique identifier representative of a unique location on a computer network with the unique location having a first response with a first set of data, wherein the scannable code is configured to be scanned a first time, via a first scanner associated with a first interface, causing the first response to be displayed through the first interface, wherein the first response includes a prompt to generate a second response having a second set of data, at least partially different from the first set of data, and wherein the first response is replaced by the second response upon generation of the second response.

Another aspect of the present disclosure relates to a method of providing a providing configurable access to a set of loadable data associated with a scannable code, the method comprising generating a unique identifier and the scannable code associated with the unique identifier, the unique identifier being representative of a unique location on a computer network and including a first response having a first set of data, receiving, at the unique location, a second set of data, and replacing the first response with a second response having at least the second set of data, wherein generating the unique identifier and the scannable code happens prior to receiving the second set of data.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

BRIEF DESCRIPTION

Figure 1:
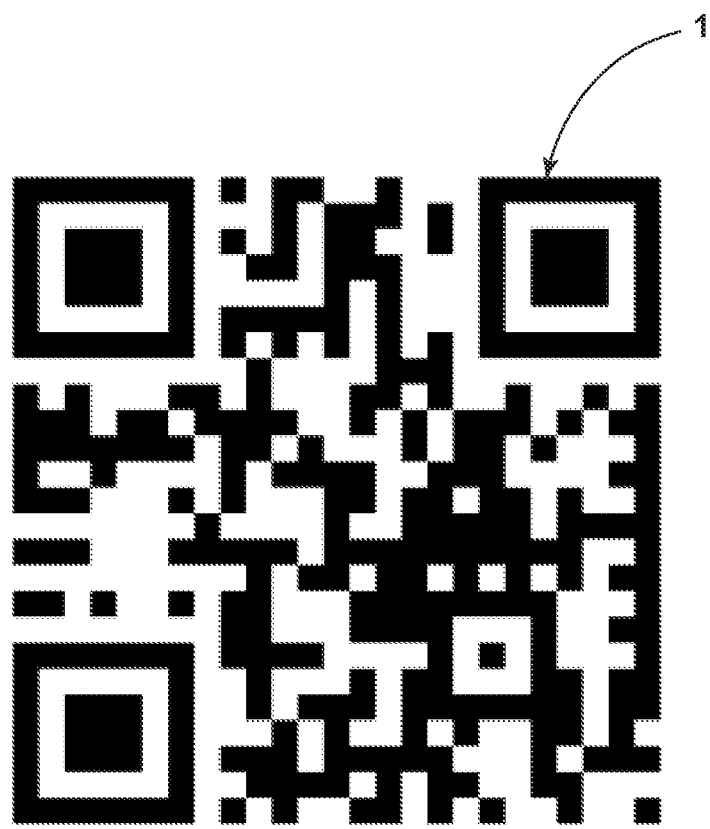
FIG. 1 is an illustration of a prior-art scannable code including black and white square modules.
Figure 2:
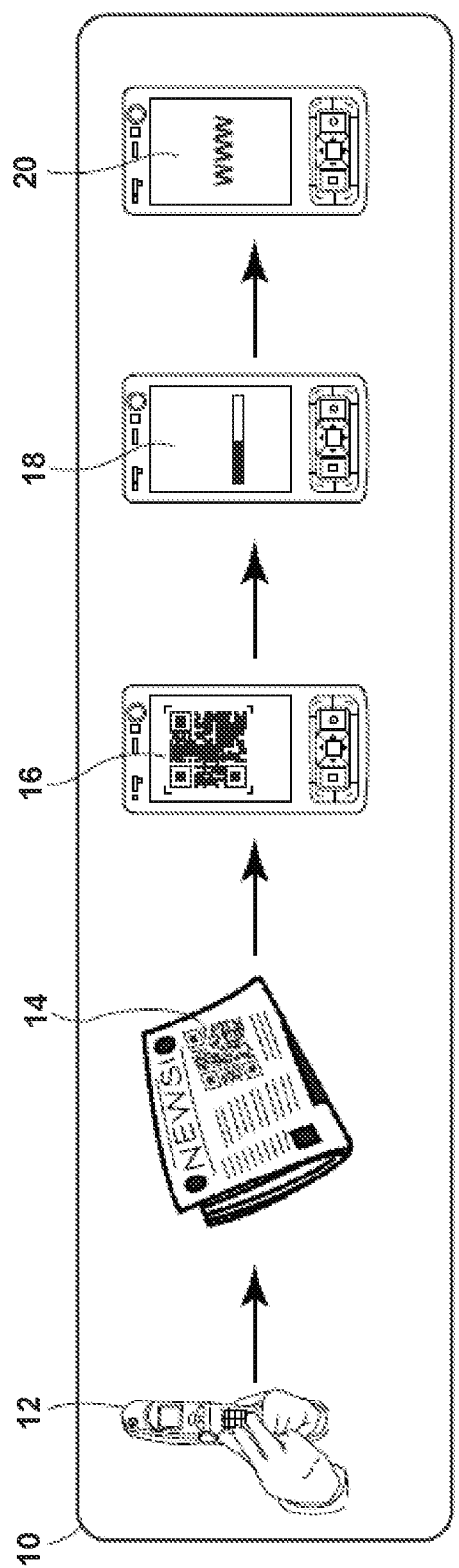
FIG. 2 is a method of viewing content linked to the prior-art scannable code of FIG. 1.

Aspects of this disclosure are related to the method and system for providing access to a set of loadable data through a scannable code. One exemplary scannable code is a QR code that can be read through a scanner on a user device (e.g., a smartphone). The scannable code, as described herein can be used in any suitable environment. As a non-limiting example, the scannable code can be provided on a greeting card (e.g., a birthday card, a salutations card, etc.). It will be appreciated, however, that the scannable code can be provided on any other suitable environment such as, but not limited to, a newspaper, a television, a computer, a billboard, a box, or any combination thereof. While described and illustrated primarily in terms of a QR code provided on a greeting card, and a smartphone, it will be appreciated that the method and system described herein can have general applicability to any suitable scannable code provided on or within any suitable environment that is configured to be scanned via any suitable device including any suitable scanner.

As used herein, the term "scannable code" can be any suitable physical device or structure that can be scanned by a scanner to transfer a response through the scanner or through an interface connected to the scanner. As a non-limiting example, the scannable code can be a QR code, a Near Field Communication (NFC) tag, a High Capacity Color Barcode (HCCB), a High Capacity Color 2-Dimensional (HCC2D) code, a snap tag, a micro QR code, a frame QR code, a iQR code, a barcode, an Augmented Reality (AR) overlay, image recognition (e.g., the scanner can recognize an object or image such that the object or image constitutes the scannable code), or any other readable or scannable optical label (e.g., a visual label or scannable code). The scannable code can further be any other suitable physical device or structure. As a non-limiting example, the scannable code can be an image of a person, animal or thing in which the scanner can identify. As a non-limiting example, the scannable code can be an image of a person that the scanner can recognize (e.g., through software).

As used herein, the term "scanner" can refer to any device configured to read, identify or otherwise transfer data from the scannable code. As a non-limiting example, the scanner can be a smartphone, a barcode scanner, a camera, an NFC module, a Bluetooth module or any combination thereof. As a non-limiting example, the scanner can include software (e.g., facial recognition, image recognition, communication software for NFC, Bluetooth, or WiFi, etc.).

As used herein, the term "loadable data" or iterations thereof, can refer to a collection of data or a single portion of data that is accessible through a unique identifier of the scannable code and can be displayed on a user device. As a non-limiting example, the set of loadable data can include, but is not limited to, a picture, a video, a link, a message containing text, a book, a newspaper, a song, a sound, a Non-Fungible Token (NFT), a blockchain, a digital asset, a crypto currency or any combinations thereof. The set of loadable data can further be defined as a set of data that is defined by (e.g., selected by) the user and is not pre-existing on the scannable code. In other words, the set of loadable data has to be associated with the scannable code after the scannable code is generated.

Furthermore, as used herein, the term "set" or a "set" of elements can be any number of elements, including only one.

Figure 4:
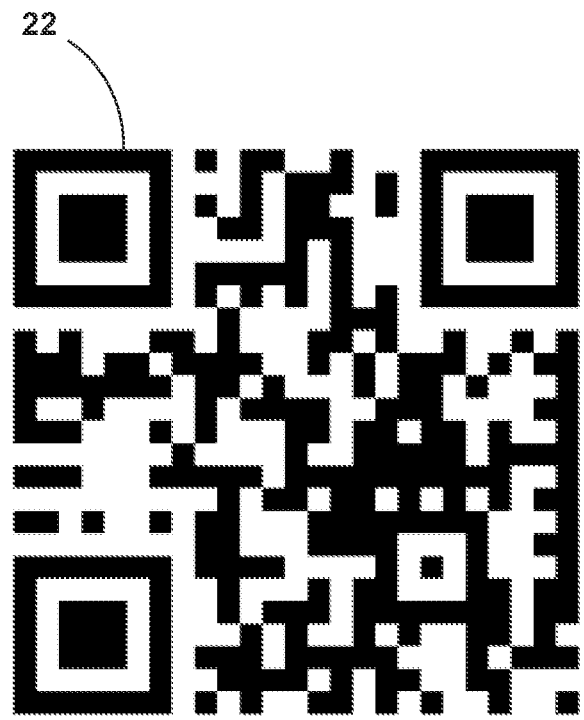
FIG. 4 is an illustration of a scannable code including black and white square modules, the scannable code having a unique identifier without a set of pre-existing loadable data.

FIG. 4 is an illustration of a scannable code. The scannable code can include an array of black and white square modules capable of storing a unique identifier. As a non-limiting example, FIG. 4 is an illustration of a Quick Response (QR) code 22 including an array of black and white square modules capable of storing a unique identifier. It will be appreciated that the scannable code of FIG. 4 can be any suitable scannable code is not limited to the QR code 22.

The QR code 22 can be defined as having at least one response when scanned. As used herein, the term "response" can refer to a set of data (e.g., a video, text, audio, an NFT, crypto currency, etc.) that is displayed to the user who scans the QR code 22. As a non-limiting example, the QR code 22 can have a first response can be defined by the unique identifier of the QR code 22. The unique identifier can be representative of a unique location on a computer network and be associated with a response of the QR code 22. As a non-limiting example, the unique identifier can be a unique URL. It will be appreciated that the unique identifier can be absent of user-defined data until a user uploads, saves, or associates a set of loadable data (e.g., user-defined data) to the unique identifier. As such, the unique identifier, and hence the QR code 22, can be defined as a unique identifier and QR code 22 that does not include a set of pre-existing loadable data.

The first response can include a first set of data that is at least partially displayed to the user. As a non-limiting example, the first set of data can be a set of instructions that are conveyed to the user on how to perform a function.

A second response, which at least partially replaces the first response, can be dictated by the user through use of the first response. In other words, the first response can be used to prompt the user to generate the second response by uploading a set of loadable data. The user can upload the set of loadable data, which can then be associated with the unique identifier or the second response such that when the QR code 22 is scanned, the set of loadable data accessible to the unique identifier is displayed. The second response can include a second set of data. As a non-limiting example, the second set of data can be at least a portion of the set of loadable data uploaded by the user. As a non-limiting example, the second set of data can include at least a portion of the first set of data.

The scannable code can be provided within any suitable environment. As a non-limiting example, the scannable code can be provided on a memento. As used herein, a memento can be defined as any present, gift, knick-knack, toy, utensil, etc. that is large enough to hold the scannable code. As a non-limiting example, the memento can be a greeting card, a cup, a bow (e.g., a bow on a present or a bow around a bouquet of flowers), a magnet, a plate, a spoon, a coaster, a toy, or any other suitable present, gift, knick-knack, toy or utensil. As a non-limiting example, the scannable code can be the QR code 22 that is physically printed onto a greeting card. As a non-limiting example, the scannable code can be an NFC tag that is embedded within a magnet such that when a user moves a scanner near the magnet, the first response or the second response is displayed through the scanner or an interface coupled to the scanner. As a non-limiting example, the scannable code can be an image that the scanner can recognize. As a non-limiting example, the scannable code can be an image of a person that the scanner can recognize. A set of loadable data attributed to that person or the image of the person can then be retrieved.

Figure 5:
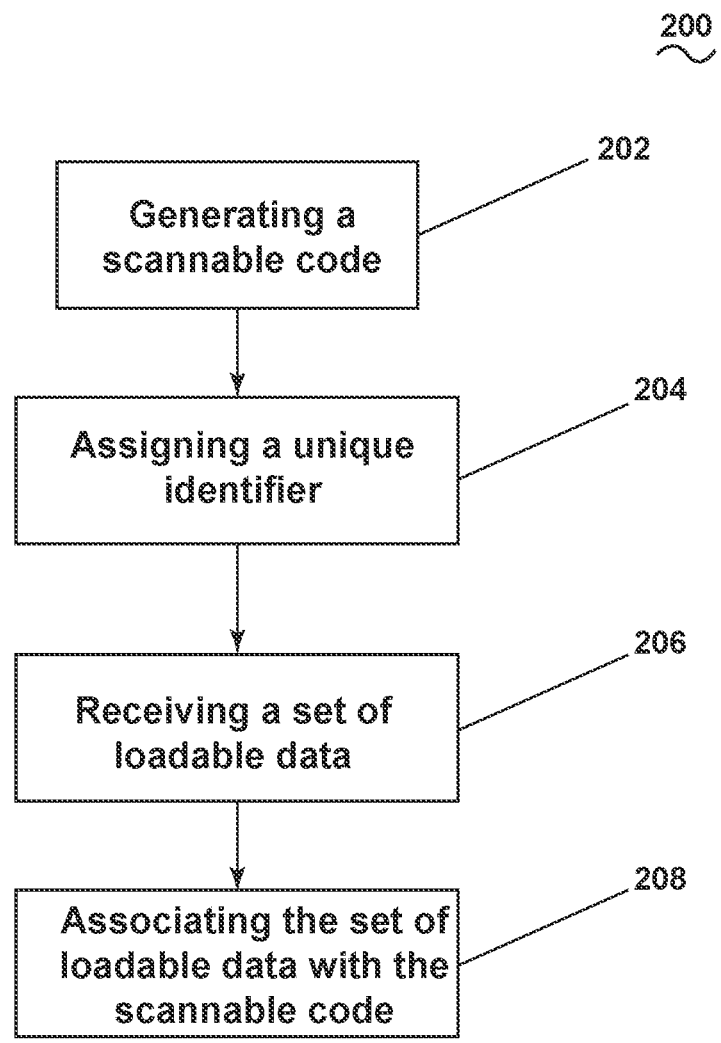
FIG. 5 is a method of providing access to a set of loadable data on the scannable code of FIG. 4.

FIG. 5 is a method 200 of providing access to a set of loadable data through the QR code 22 of FIG. 4. The method 200 is described in terms of the QR code 22, however, it will be appreciated that the method 200 can be any suitable scannable code as described herein.

The method 200 can include generating the scannable code, at 202. The generation of the scannable code can be defined as the manufacture of, the printing of, or otherwise the creation of the scannable code. As a non-limiting example, the generation of the scannable code can be defined as the creation or printing of the unique set of black and white square modules that is unique to the scannable code. The creation can be either physical or virtual. As a non-limiting example, the generation of the scannable code can refer to the printing of the Scannable code or it can refer to the virtually-generated scannable code through any suitable method such as, but not limited to, a program on a computer. A unique identifier can be assigned to the scannable code, at 204. The unique identifier can be unique to the scannable code and be representative of a unique location on a computer network (e.g., a URL). The unique identifier can be further associated with a response (e.g., the first response and the second response) of the scannable code. The unique identifier can be an alphanumeric combination. For example, in the case where the unique identifier is a URL, the unique identifier can include a webpage with a series of numbers or letters that are unique to the unique identifier. The generation of the scannable code, at 202, and the assigning of the unique identifier, at 204, can be done in tandem with each other, or the assigning the unique identifier, at 204, can occur prior to the generation of the scannable code, at 202. As discussed herein, a set of pre-existing, user-defined loadable data is not accessible to, through, or otherwise loaded on the unique identifier when it is assigned to the scannable code. As discussed herein, however, a first set of data (e.g., a set of instructions) can be loaded through the scannable code prior to any user-defined data being uploaded. As such, the scannable code at 202 and 204 can be defined as a scannable code without user-defined data (e.g., the set of loadable data) that includes a unique identifier that does not have pre-existing access to a set of loadable data. A set of loadable data can be received at the unique identifier, at 206. As a non-limiting example, the set of loadable data can be received by uploading the set of loadable data to the unique identifier. For example, a user, a program, a computer, or the like could upload a set of loadable data to the unique identifier such that the unique identifier can receive the set of loadable data.

The set of loadable data is ultimately associated with the unique identifier, at 208. In other words, the set of loadable data is ultimately associated with the second response of the scannable code so that subsequent network access of the unique identifier will display the set of loadable data, at 208. The association of the set of loadable data with the unique identifier, and hence the scannable code, can further be defined as providing access to the set of loadable data through the unique identifier.

The set of loadable data can be saved to a memory accessible to the unique identifier. As used herein, the term "accessible to" or iterations thereof can be defined as memory that is included within, or otherwise accessible to (e.g., through a communication) the unique identifier. As a non-limiting example, the unique identifier can be a URL and the set of loadable data can be saved directly to the URL. As another non-limiting example, the memory can be any other suitable memory that is accessible through the unique identifier or the scannable code such as, but not limited to, a server, a physical memory, a cloud storage or any combination thereof. It will be appreciated that the set of loadable data once it is saved to the memory can include a unique identification corresponding to the unique identifier. It is contemplated that the memory can include more than one sets of loadable data, with each set of loadable data being unique to a specific scannable code and each including its own unique identification. Each set of loadable data can include a unique identification that corresponds to the unique identifier and the scannable code. As such, the memory can include multiple sets of loadable data, with each being assigned to differing scannable code and unique identifiers. The unique identifications can ensure that each set of loadable data is assigned to the whichever unique identifier received the respective set of loadable data.

The process of assigning the unique identifier to the scannable code, at 204, receiving the set of loadable data, at 206, and associating the loadable data with the unique identifier, at 208, can further be defined as the process of activating the scannable code. When the scannable code is first generated, at 202, the scannable code can be defined as an inactivated scannable code. When the scannable code is generated, the unique identification already exists or is also generated. It is contemplated that the first set of data representative of the first response can be associated with (e.g., uploaded to) the unique identification when the unique identification is generated. As such, after generation of the scannable code, if the scannable code were to be scanned, the first response, including at least a portion of the first set of data, would be displayed or accessed. The method 200 can be defined as a method 200 of activating the scannable code.

Figure 6:
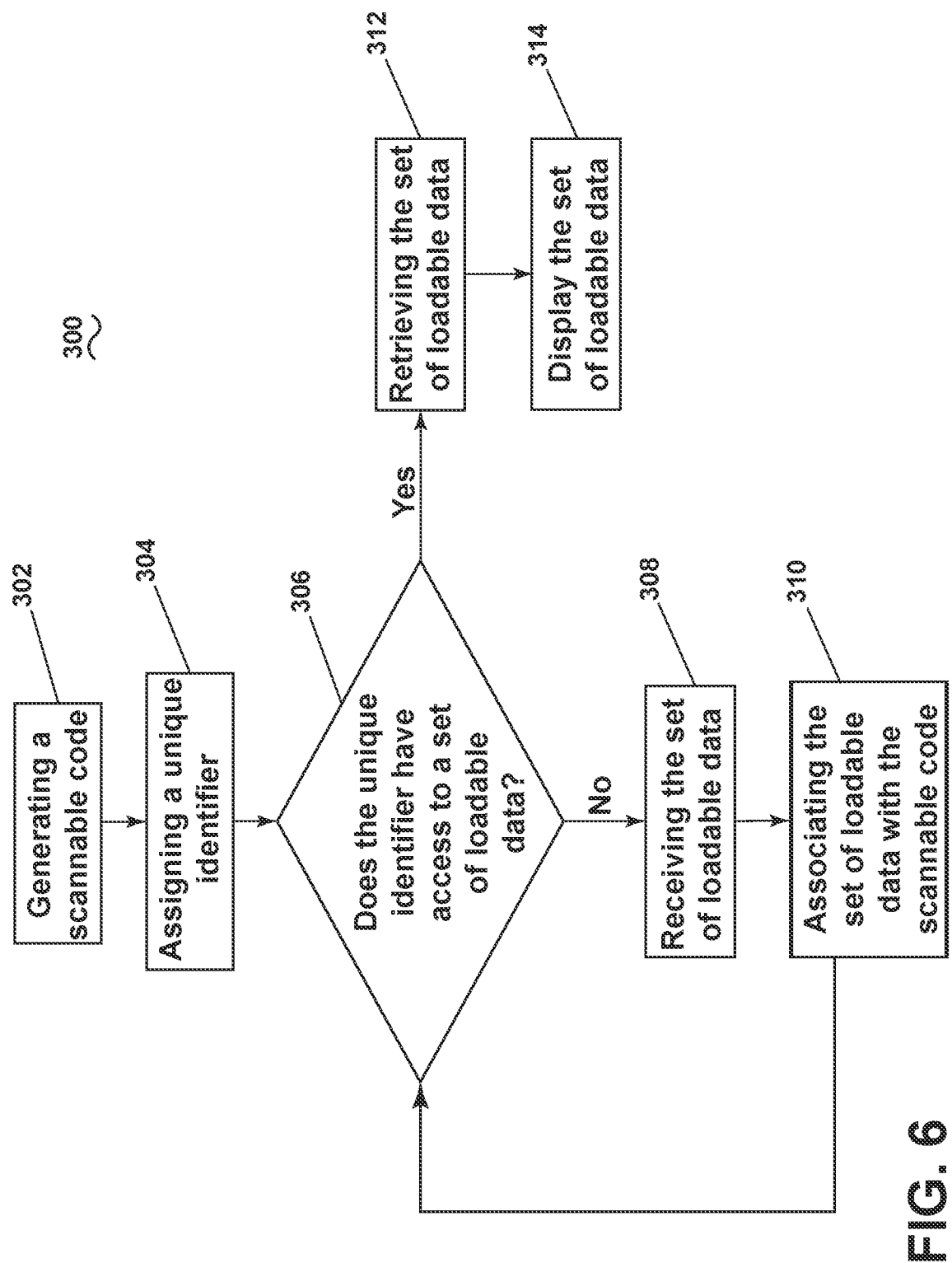
FIG. 6 is an exemplary method of providing access to the set of loadable data of the scannable code of FIG. 4, further comprising checking if the set of loadable data is accessible on the scannable code.

FIG. 6 illustrates an exemplary method 300 of providing access to a set of loadable data through the scannable code of FIG. 4.

The generation of the scannable code (e.g., the QR code 22), at 302. The unique identifier can be assigned to the scannable code, at 304. As disused herein, the assigning of the unique identifier, at 304, can happen prior to or in tandem with the generation of the scannable code, at 302. The generation of the scannable code and the assigning of the unique identifier, at 302 and 304, respectively, is similar to the generation of the scannable code and the assigning of the unique identifier, at 202 and 204, respectively, of the method 200. If the unique identifier is accessed, a check can be performed to determine if a set of loadable data is associated with the unique identifier, and hence the scannable code, at 306. In other words, this check can be performed to see if there has been a set of loadable data that has already been associated with the unique identifier and saved to memory accessible via the unique identifier and scannable code such that the configurable response of the scannable code would display the set of loadable data if the unique identifier were accessed (e.g., the scannable code is scanned).

If it is determined that there is not a set of loadable data accessible through the unique identifier, then the unique identifier can receive the set of loadable data, at 308. The set of loadable data can be associated with the unique identifier and the configurable response of the scannable code, at 310. The receiving and the associating of the set of loadable data, at 308 and 310, respectively, is similar to the receiving and the saving of the loadable data, at 206 and 208, respectively, of the method 200. As noted previously, the steps of assigning the unique identifier, at 304, uploading or receiving the set of loadable data, at 308, and associating the set of loadable data, at 310, can constitute the activation of the scannable code. In other words, if it is determined, at 306, that the scannable code is not activated, the process of activating the QR code 22 can be performed.

If the check, at 306, determines that the unique identifier does have access to the set of loadable data (e.g., the scannable code has been activated), the set of loadable data can be retrieved, at 312. The retrieval of the set of loadable data can be done by accessing the memory that is accessible to the unique identifier and retrieving the set of loadable data that corresponds to the unique identifier. As discussed herein, it is contemplated that the memory can include more than one set of loadable data, with each set of loadable data being unique to a specific scannable code including its own unique identifier. As such, when the set of loadable data is retrieved from the memory, the unique identification of the set of loadable data referred to in order to ensure that the set of loadable data is returned to or otherwise retrieved through the unique identifier. The unique identifier can then display the set of loadable data, at 314. The display of the set of loadable data through the unique identifier can be done through an interface of a device such as, but not limited to, a computer, a kiosk, a mobile phone, a tablet, a monitor, a television, or any combination thereof. As a non-limiting example, the set of loadable data can be a video, the unique identifier can be a URL, and the interface can be a user's mobile phone. If the user scans the scannable code and scannable code already includes the set of loadable data (e.g., the video), the set of loadable data can be retrieved and the video can be played on the screen of the user's mobile phone.

It will be appreciated that the method 300 can further be described in terms of the first response and the second response. As a non-limiting example, if the check, at 306, determines that no loadable data is accessible, then the first response can be displayed to the user who scans the scannable code. The first response can be a set of instructions on how to associate a set of loadable data with the scannable code or unique identifier. If, however, the check, at 306, determines that loadable data is accessible, then the second response (e.g., the response having at least a portion of the loadable data) can be displayed, at 314, to the user who scans the scannable code.

The sequences depicted are for illustrative purposes only and is not meant to limit the method 200, 300 in any way as it is understood that the portions of the method can proceed in a different logical order, additional or intervening portions can be included, or described portions of the method can be divided into multiple portions, or described portions of the method can be omitted without detracting from the described method. For example, the method 200, 300 can include various other steps.

In one non-limiting example, the method 200, 300 can include assigning a unique identification to the set of loadable data when it is associated with the unique identifier, at 208, 310. As such, each set of loadable data within the memory can include a unique identification that is unique to the scannable code or the unique identifier of the scannable code that received the set of loadable data.

As a non-limiting example, the method 300 can include determining which set of loadable data within the memory accessible via the unique identifier corresponds to the unique identifier. The determination can be done by comparing the unique identifications of one or more sets of loadable data with the unique identifier of the scannable code. As a non-limiting example, the unique identifier can include an alphanumeric identifier of "A123". The unique identification of the set of loadable data can include the same alphanumeric identifier. As such, only the set of loadable data with a matching identification will be retrieved, at 312, and ultimately displayed, at 314.

Figure 7:
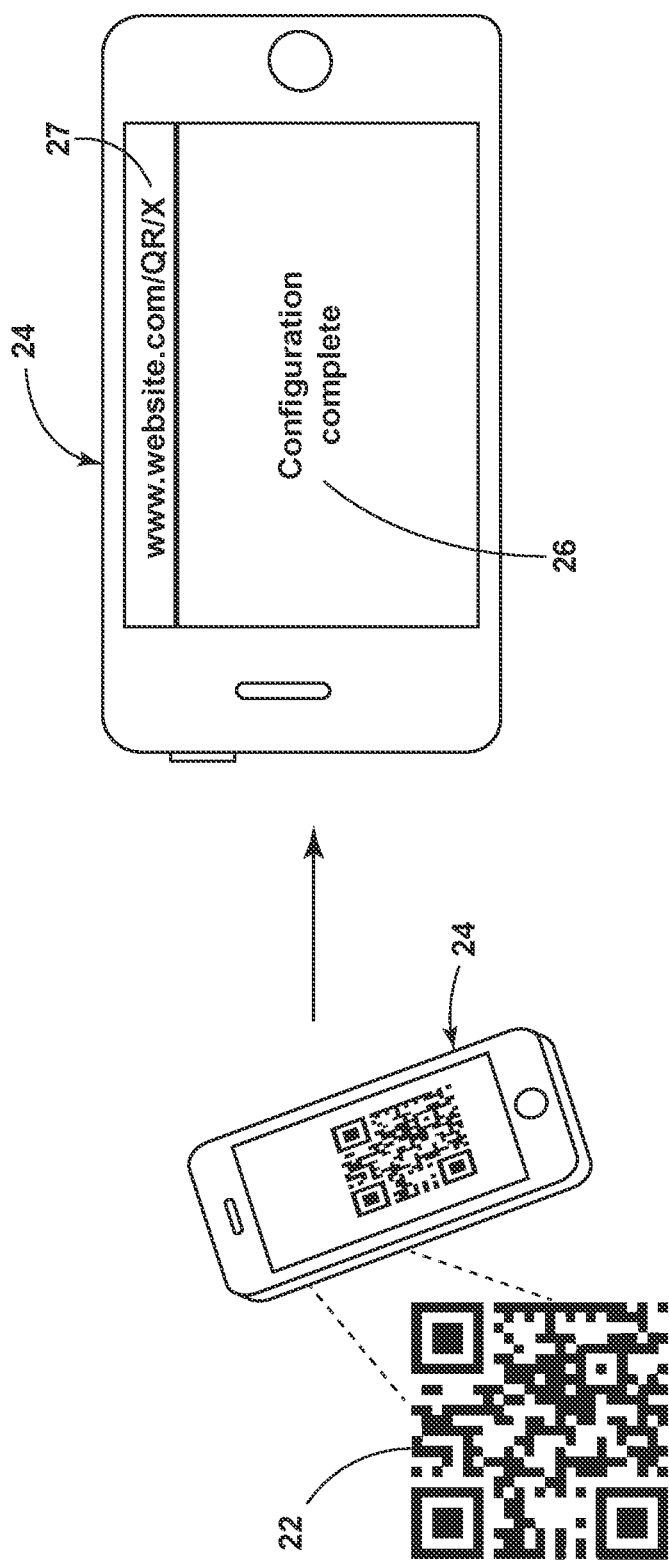
FIG. 7 is a method of a user activating the scannable code of FIG. 4.

FIG. 7 is an illustration of a method of activating the scannable code of FIG. 4. Although described in terms of activating the QR code 22, it will be appreciated that the method can be applied to the activation of any suitable scannable code as described herein.

The QR code 22 can include or otherwise be encoded with the unique identifier. As a non-limiting example, the QR code 22 can be encoded with a unique URL 27. The QR code 22 may be scanned by a user. As a non-limiting example, the QR code 22 can be scanned by a user device 24 including a computing device or a mobile smartphone device. The user device 24 can further include an image reading device and a code reader (e.g., a reader configured to read or interpret the QR code 22). As a non-limiting example, the user device 24 can be a user's smartphone and the image reading device can be a camera of the smartphone. The smart phone can be installed with or otherwise include a QR reader (e.g., an app or software on the user's device 24), such that the QR code 22 can be read by pointing the smartphone toward the QR code 22. It will be appreciated that the user device 24 can be any suitable device such as, but not limited to, a smartphone, a tablet, a computer, a TV, a digital camera, or any combination thereof. The user device 24 decodes the QR code 22 and directs the user device 24 to a unique webpage 26 corresponding to the unique identifier. As a non-limiting example, the user device 24 can be directed to a unique URL 27 encoded in the QR code 22. Scanning the inactivated QR code 22 can subsequently put the user of the user's device 24 through the process of activating the QR code 22

To activate the QR code 22, the user may be redirected to an activation webpage after the QR code 22 is scanned, where at least a portion of the first response of the QR code 22 is displayed to the user. The activation may also occur automatically the first time the QR code 22 is scanned. The activation webpage may request the user to sign in using a user's account information such as a username and password associated with the service provider's website, to enter an activation code provided with the QR code 22 or any other activation method well known in the art. As discussed herein, the activation of the QR code 22 can result in the set of loadable data being associated with the configurable response of the QR code 22 so that subsequent network access to the unique identifier responds with the configurable response.

It is contemplated that the QR code 22 can be provided on a memento (e.g., a greeting card, magnet, etc.) that is available for purchase to a consumer. The QR code 22, before purchase, can be inactive such that if a consumer were to scan the QR code 22 prior to it being purchased, the first response would not be displayed to the user and the user could not upload a set of loadable data (e.g., defined the second response) without first purchasing the memento having the QR code 22. It will be further appreciated that the first response can include an interface where the user can purchase the memento and subsequently upload the set of loadable data to define the second response. In other words, a consumer can scan the QR code 22, purchase the memento through the first response associated with the unique identification, upload the set of loadable data and ultimately define the second response of the QR code 22.

Figure 8:
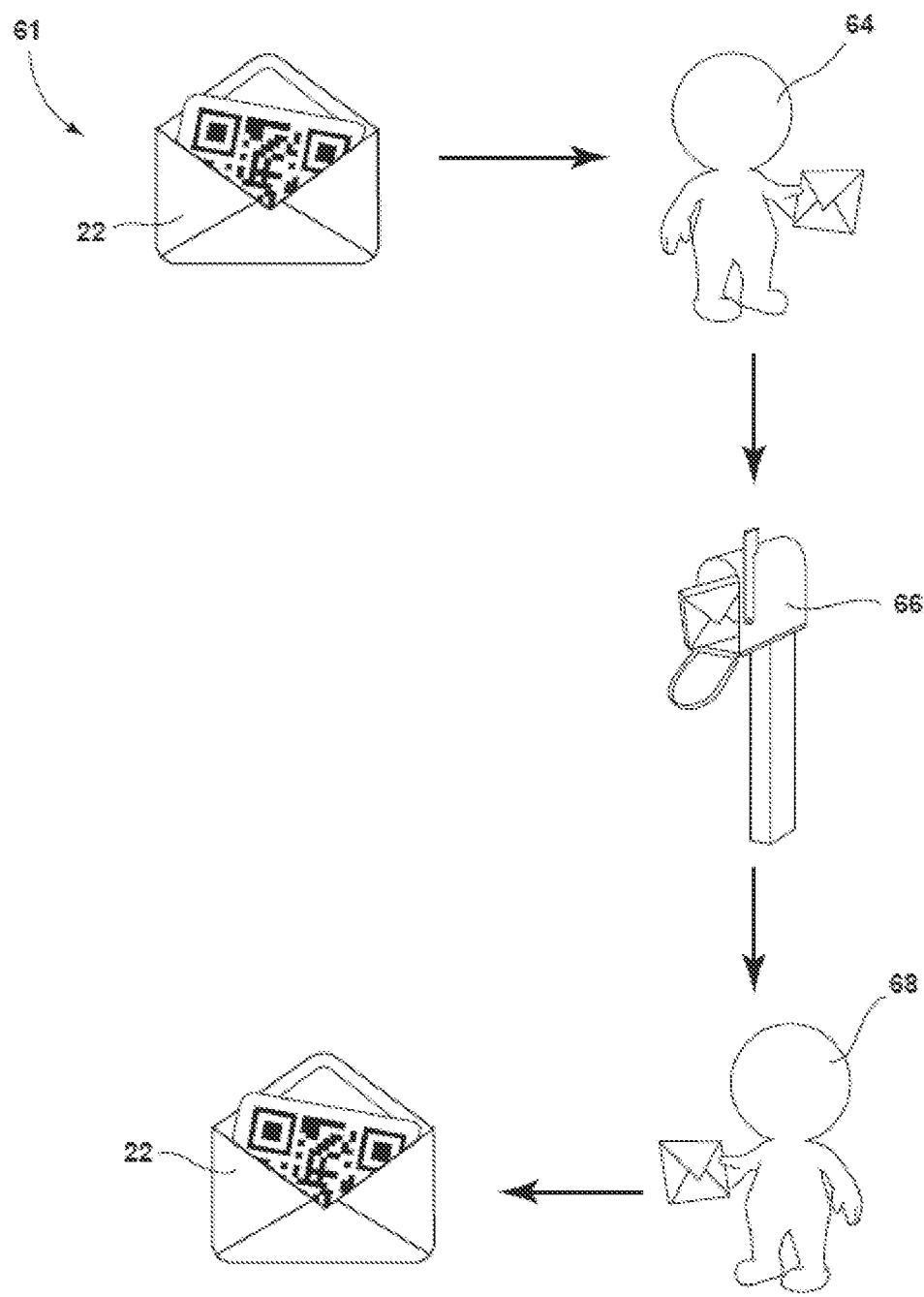
FIG. 8 is a method of a user distributing the scannable code that was activated through the method of FIG. 7.

FIG. 8 is an illustration of a method of a user 64 sending the activated QR code of FIG. 7 to a recipient 68. A user 64 can send the activated QR code 22 having the set of loadable data linked to the unique URL 27 encoded in the QR code 22 to a recipient 68. The recipient 68 receives the QR code 22 which is ready to be scanned for viewing of the set of loadable data.

It will be understood that a user may send a QR code 22 having the set of loadable data to a recipient in both physical and electronic forms by methods including but not limited to e-mail, text messages, social networking services, mail services, delivery services, courier services, in person or any other method of sending electronic data or physical objects well known in the art.

Figure 9:
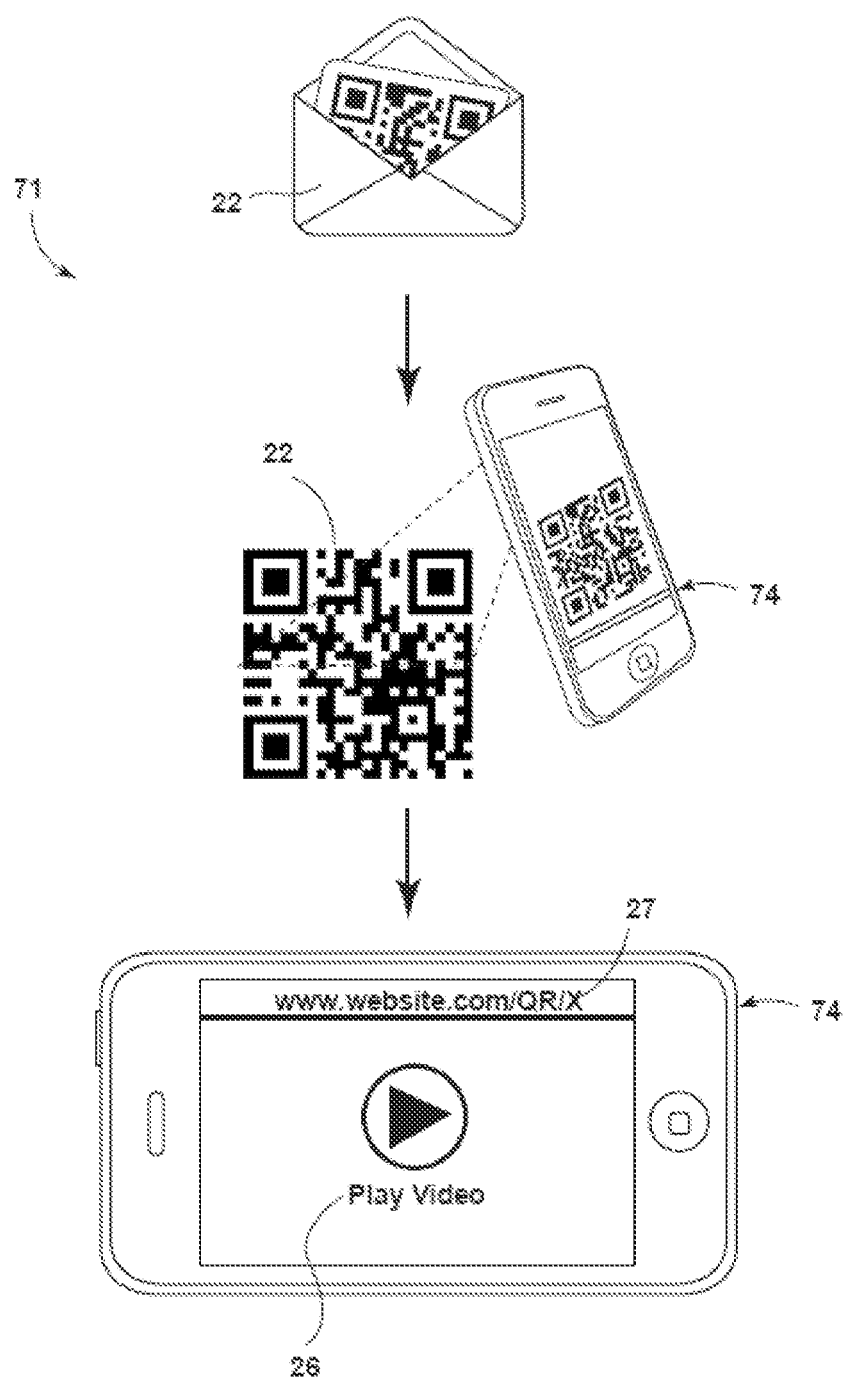
FIG. 9 is a method of a recipient receiving the scannable code that was activated through the method of FIG. 7.

FIG. 9 is an illustration of a method of the recipient 68 (FIG. 8) receiving the activated QR code 22 of FIG. 8 including the set of loadable data. The QR code 22 can be received by the recipient 68 (FIG. 8), who can then scan the QR code 22 with their user device 24 (e.g., a smartphone equipped with a QR reader). Once scanned, the user device 24 accesses a unique webpage 26 corresponding to the unique URL 27 or the unique identifier encoded in the QR code 22 having the set of loadable data such as a video. The recipient may then view the content displayed on the unique webpage 26 (e.g., the recipient can view the second response of the QR code 22).

The user 64 can activate the QR code 22 by scanning the QR code 22 with their user device 24 and ultimately saving a user-defined set of loadable data to the memory accessible via the QR code 22. The user 64 can then go through the process of giving the recipient 68 the memento with the QR code 22 (e.g., through mail, text, email, etc.). The recipient 68 can scan the already-activated QR code 22 on the card with their user device. The set of loadable data that was defined by the user 64 can then be displayed to the recipient 68 through the interface of the user's device of the recipient 68.

Figure 10:
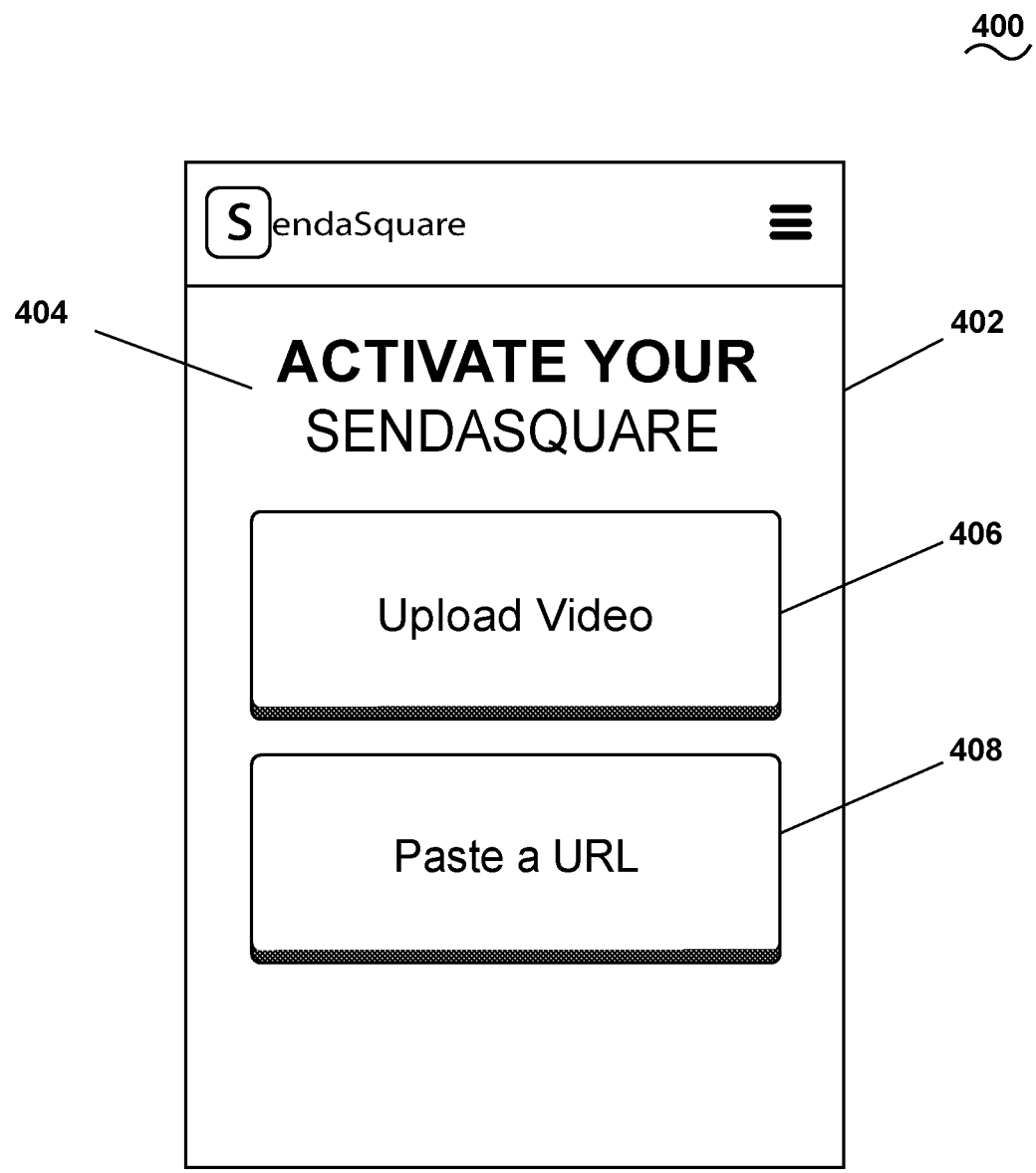
FIG. 10 is a first activation interface of a method to activate the scannable code of FIG. 4, including a unique identifier.

FIG. 10 illustrates a method 400 of activating the scannable code of FIG. 4.

The method includes the display of a first activation interface 402 used to activate the scannable code. The first activation interface 402 can be defined by the first response or the first set of data associated with the unique identification of the scannable code. It is contemplated that the first activation interface 402 can be a visual representation of what the user 64 would see after scanning the scannable code including the unique identifier without the set of loadable data (e.g., the user scans a not activated scannable code). As discussed herein, the unique identifier assigned to the scannable code can be a URL (e.g., URL 27). The first activation interface 402 can be a visual representation of the URL and hence the unique identifier of the scannable code. It will be appreciated that the first activation interface 402 can be displayed through any suitable method. For example, the first activation interface 402 may be brought up through a web browser, or an application on the user's device 24 (FIG. 6).

The first activation interface 402 can be displayed on a user interface (e.g., a screen of a user's device 24). The first activation interface 402 can be brought up by scanning a not activated scannable code. A prompt 404 indicating to the user 64 what needs to be done to activate the scannable code can be displayed. As a non-limiting example, the prompt 404 can indicate to the user that this is how you "Activate Your SendaSquare". Options to upload the set of loadable data can be displayed on the user interface. As a non-limiting example, at least one of an upload option 406 or a paste option 408 can be displayed. The upload option 406 can allow for the user 64 to upload content that they want to associate with the configurable response of the scannable code. For example, the user 64 can upload a picture, video, NFT, or audio file that is saved on a memory accessible to their user device 24. Alternatively, the user can use an external memory (e.g., a USB memory stick, a floppy disc, a compact disc, etc.) to upload the set of loadable data through the first activation interface 402. The paste option 408 can allow for a user to paste a set of loadable data including a text. For example, the set of loadable data can be, but is not limited to, a URL, a text message, a book, or an article. In the case of the URL, the user 64 can, for example, upload a URL to their place of business such that the scannable code, when scanned, would lead the person who is scanning the scannable code to the users 64 website for their place of business. It will be further appreciated that the first activation interface 402 can further be defined as an interface for the method 400 that can be used to select the set of loadable data that is desired to be uploaded.

Figure 3:
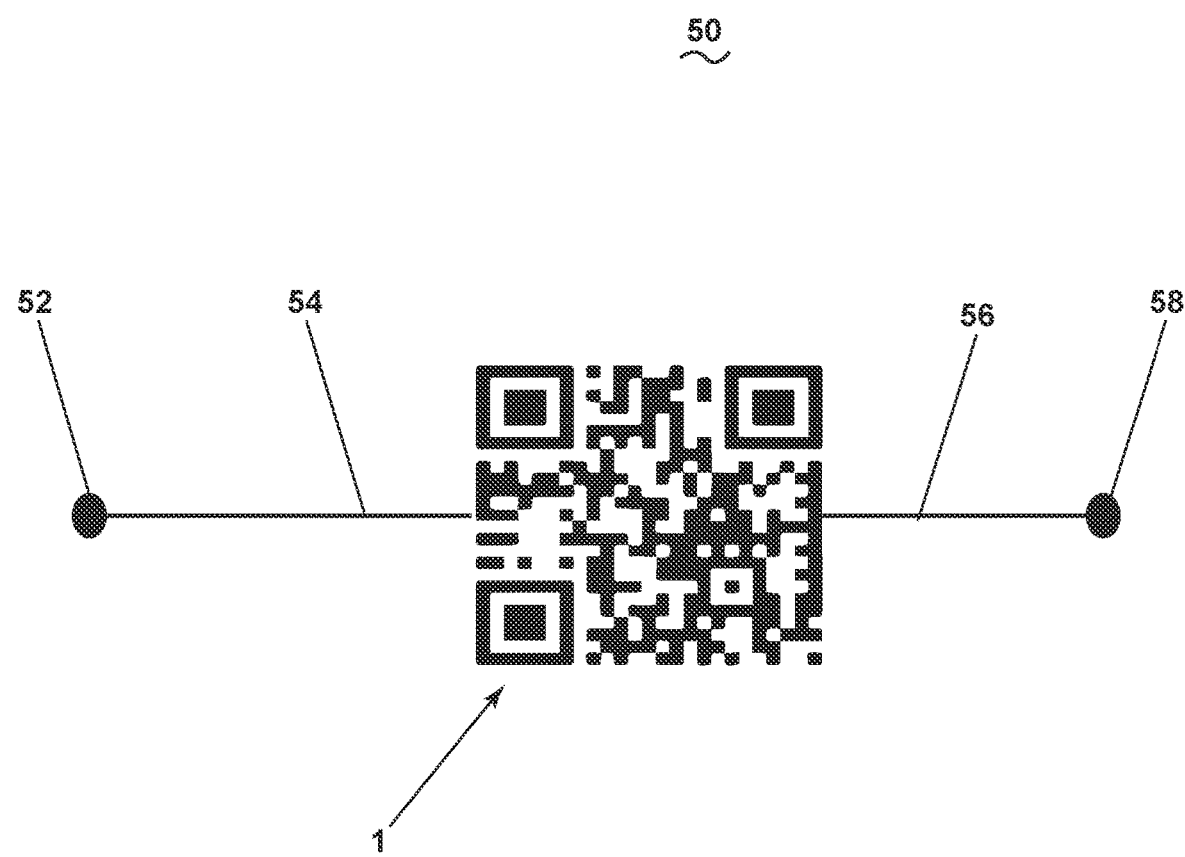
FIG. 3 is a method of assigning content to the prior-art scannable code of FIG. 1, the assigning of the content occurring before the generation of the prior-art scannable code.
Figure 11:
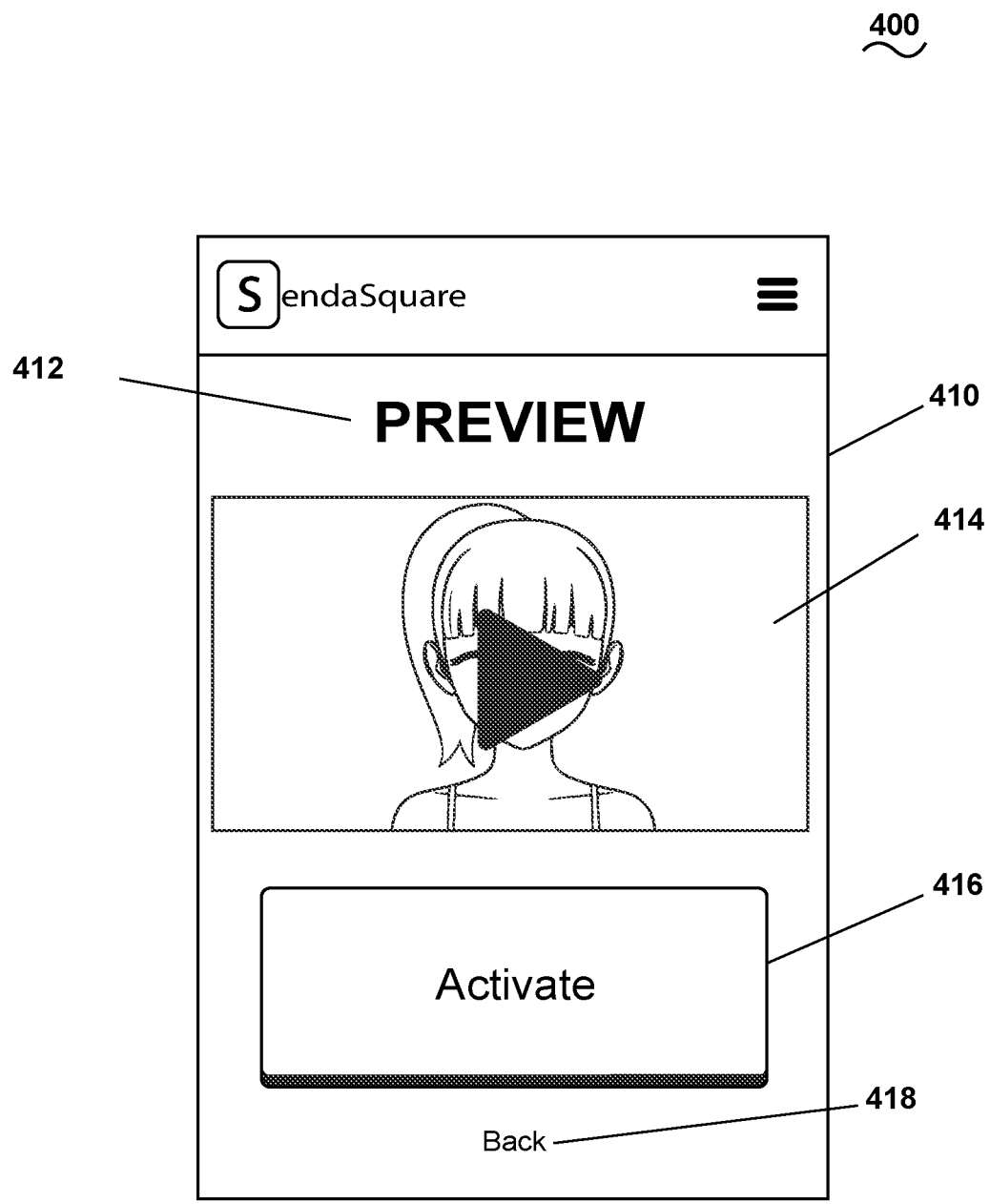
FIG. 11 is a second activation interface of the method of FIG. 10, further comprising an option to upload a set of loadable data

FIG. 11 is an illustration of a second activation interface 410 of the method 400 of FIG. 10 to activate the scannable code of FIG. 3. The second activation interface 410 can be displayed directly after the first activation interface 402. In other words, the second activation interface 410 can be displayed once the user 64 as selected the set of loadable data that they would like to upload or otherwise have displayed when the scannable code is scanned.

The second activation interface 410 can include a prompt 412 informing the user 64 what needs to be done to activate the scannable code. The second activation interface 410 can be a portion of the first response having the first set of data. As a non-limiting example, the prompt 404 can indicate to the user that the second activation interface 410 displays a preview of the selected set of loadable data that they have decided to upload. As the second response can be defined at least partially by the second set of data (e.g., at least partially by the set of loadable data), the second activation interface 410 can display a preview of the second response. A preview 414 of the set of loadable data can be displayed on the second activation interface 410. As a non-limiting example, if the set of loadable data is a picture, the picture can be displayed on the second activation interface 410. It is contemplated that the preview 414 can display exactly what will be shown if the scannable code were to be scanned after it was activated.

The second activation interface 410 can further include at least one of an activation option 416 or a back option 418. The activation option 416 can be used to confirm that the user wants to upload the selected set of loadable data, or otherwise have the set of loadable data associated with the unique identifier. As such, the activation option can be further defined as a confirmation option or an upload option. The back option 418 can be used to revert to the first activation interface 402. In other words, the back option 418 can be used to go back to the first activation interface 402, thus allowing for the user 64 to once again select which set of loadable data they want displayed when the scannable code is scanned after activation.

As a non-limiting example, if the user is okay with the preview 414 and wishes to upload the set of loadable data (e.g., activate the scannable code with the set of loadable data), then the user 64 can press the activation option 416. However, if the user 64 decides that they do not want to upload their selected set of loadable data, they can press the back option 418 so the user 64 can reselect their set of loadable data (e.g., the user 64 wants to upload a different set of loadable data than what was originally requested).

Figure 12:
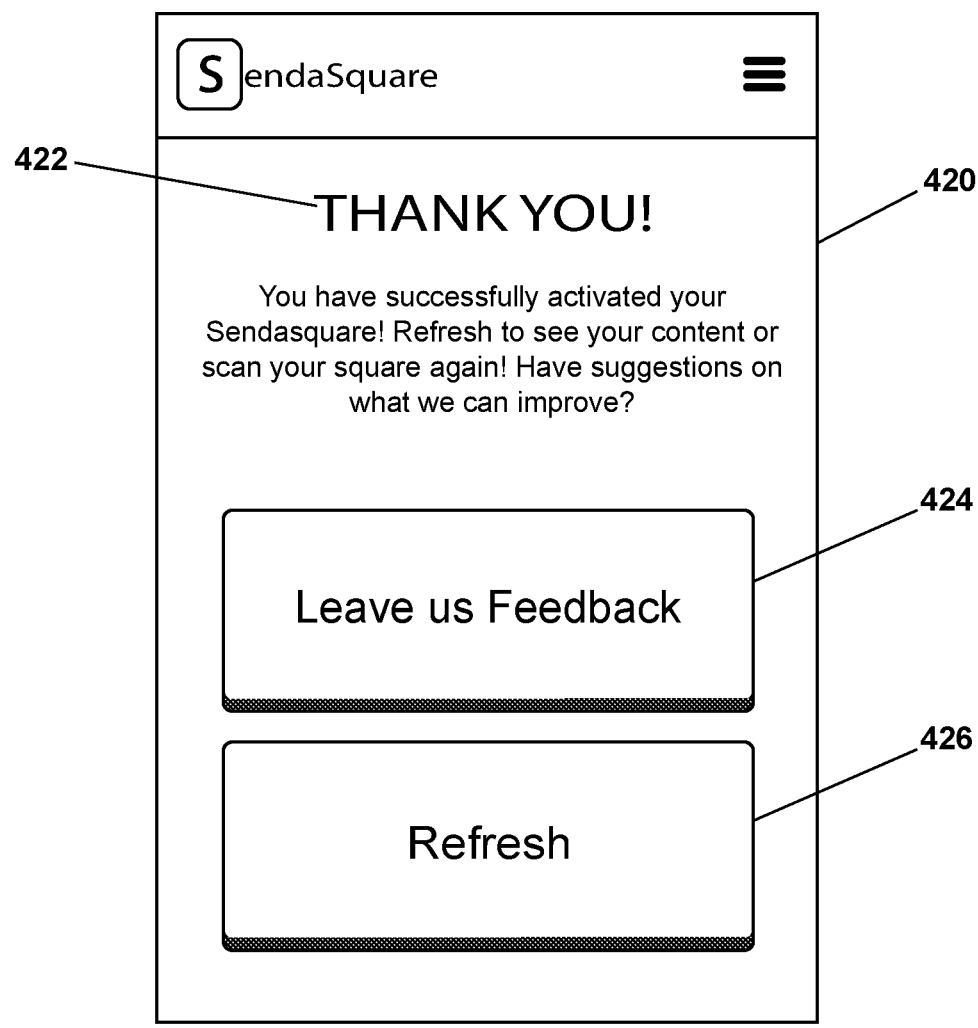
FIG. 12 is a third activation interface of the method of FIG. 10, further comprising a confirmation that the set of loadable data has been uploaded.

FIG. 12 is an illustration of a third activation interface 420 of the method 400 of FIG. 10. The third activation interface 420 can be displayed directly after the user selects the activation option 416 on the second activation interface 410. In other words, the third activation interface 420 can be displayed once the user 64 has decided that they wish to upload their selected set of loadable data (e.g., they want the selected set of loadable data to be displayed once the activated scannable code is scanned).

The third activation interface 420 can include a prompt 422 informing the user 64 that they have successfully activated the scannable code. As a non-limiting example, the prompt 422 can thank the user for activating the scannable code and supply instructions on how to view the set of loadable data that was uploaded and now accessible through the unique identifier (e.g., by scanning the scannable code).

The third activation interface 420 can further include at least one of a feedback option 424 or a refresh option 426. The feedback option 424 can be used to provide comments, recommendations, reviews, or notes. As a non-limiting example, the feedback option 424 can be used to submit a review concerning the activation of the scannable code. The refresh option 426 can be used to display the set of loadable data that the user uploaded. In other words, the refresh option 426 can be used to display what will be shown if someone were to scan the now activated scannable code.

Figure 13:
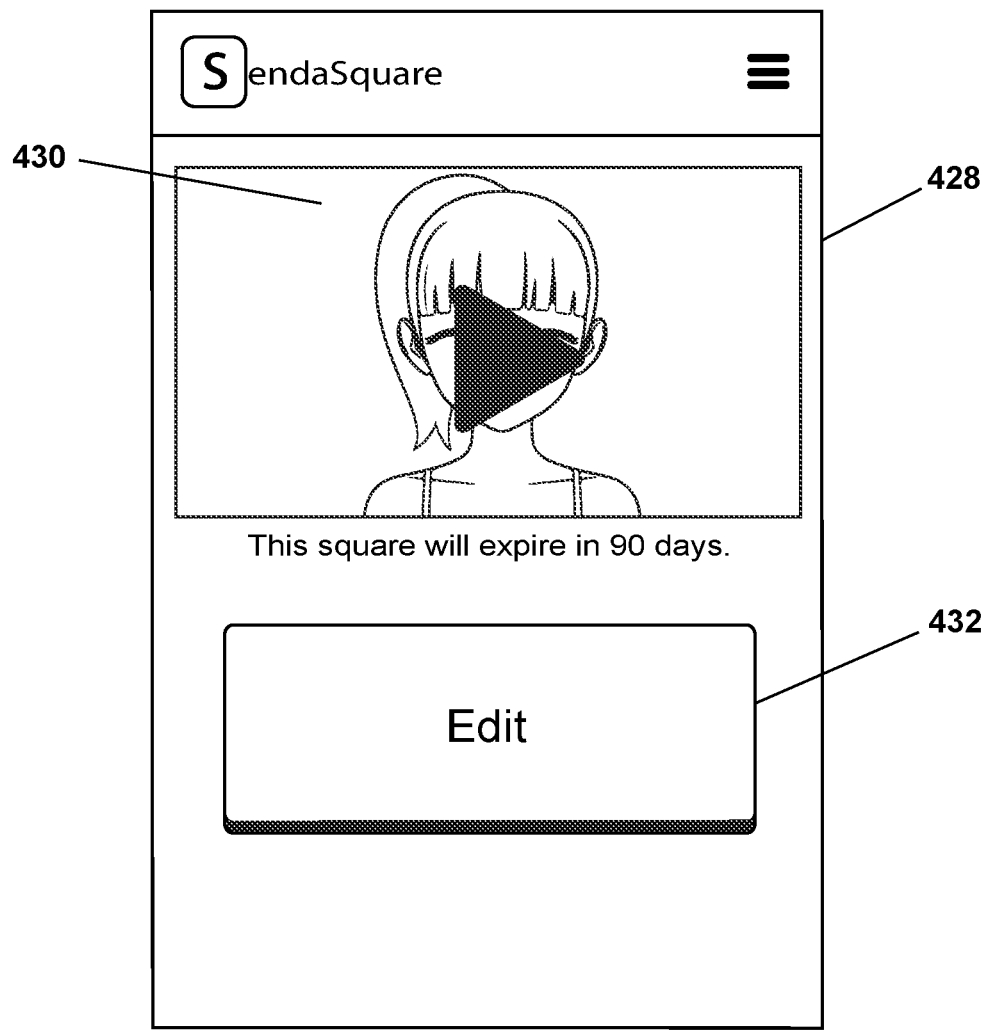
FIG. 13 is a fourth activation interface of the method of FIG. 10, further comprising an option to edit the set of loadable data.

FIG. 13 is an illustration of a fourth activation interface 428 of the method 400 of FIG. 10. The fourth activation interface 428 can be displayed directly after the user selects the refresh option 426 on the third activation interface 420, or otherwise scans the scannable code again. In other words, the fourth activation interface 428 can be displayed if the user wishes to see the set of loadable data (e.g., the second response) that is now accessible via the unique identifier or otherwise saved to the memory accessible via the unique identifier of the scannable code. The fourth activation interface 428 is an interface that would be displayed if scanned by the user or the scanner who originally activated the scannable code. The fourth activation interface 428 would not be displayed to a recipient of the scannable code. Instead, the recipient would see the second response, without an option to edit the second response.

The fourth activation interface 428 can include a preview 430 and an edit option 432. The preview 430 can be similar to the preview 414 in that the preview 430 displays the set of loadable data that will be seen if someone were to scan the now-activated scannable code. The edit option 432 can allow for the user to edit the set of loadable data that is associated with the second response or unique identifier. As a non-limiting example, the edit option 432 can allow the user to make changes directly to the set of loadable data that they selected and uploaded. The changes can include, but are not limited to, cropping, cutting, editing (e.g., color modifications, tints, etc.), adjusting the sound, or any combination thereof. As another non-limiting example, the edit option 432 can be used to replace the set of loadable data with a new set of loadable data, therefore, redefining the second set of data and the second response. As such, if the edit option 432 were used, the user could select the new set of loadable data such that the scannable code would display the new set of loadable data if it were scanned. It is contemplated that the edit option 432 can redirect the user 64 to any of the first activation interface 402, the second activation interface 410, or the third activation interface 420. As a non-limiting example, the edit option 432 could redirect the user to the first activation interface 402. The user 64 could then go through the method 400 again to activate the scannable code with the new set of loadable data or an edited set of loadable data.

Figure 14:
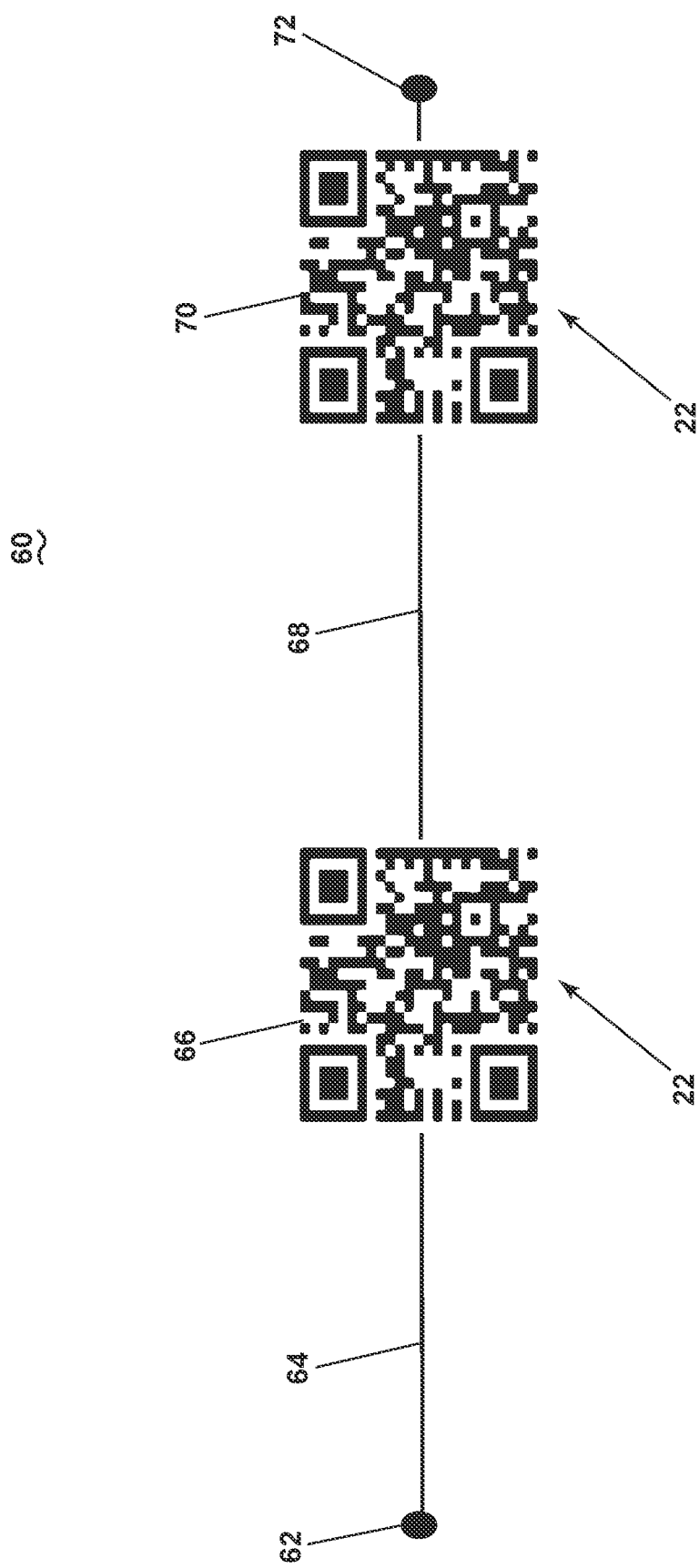
FIG. 14 is a method of assigning content to the scannable code of FIG. 4, the assigning of the content occurring after the generation of the scannable code.

FIG. 14 is a method 60 of assigning content to the scannable code of FIG. 4. As used herein, the content can be any suitable content such as the set of loadable data.

The method 60 can begin by generating the scannable code, at 62. The generation of the scannable code can include the physical printing of the scannable code (e.g., on a piece of paper, greeting card, etc.), or the computer-generation of the scannable code. The unique identifier (e.g., a unique URL) can also be assigned to the scannable code at 64 or prior to 64. It will be appreciated that the generation of the scannable code and the assignation of the unique identifier can be done in tandem. For example, when the scannable code is generated, the unique identifier can be assigned to the scannable code. Alternatively, the scannable code can be generated and then the unique identifier can be assigned to the already-generated scannable code. The scannable code can then be read, at 66. As a non-limiting example, the scanning can be done by a user pointing their smartphone camera toward the scannable code. The smartphone can include an application or a pre-existing capability to read the scannable code once it is scanned and direct the user of the smartphone to the unique identifier (e.g., the unique URL) and display at least a portion of the first response. It will be appreciated, however, that reading of the barcode can be done through any other suitable method such as, but not limited to, scanning, capturing (e.g., through a camera), wireless transmission (e.g., through NFC), wired transmission, or any combination thereof. The user can select the content (e.g., the set of loadable data) that they want to be assigned to the scannable code, at 68. In other words, the user can select which content they want to have assigned to the Scannable code or the unique identifier of the scannable code. This occurs after the generation of the scannable code. As the generation of the scannable code can include the printing of the scannable code, the assignation of content, at 68, can occur after the printing of the scannable code.

The scannable code can then be read to determine the content on the scannable code, at 70. The reading can be done through the user who assigned the content to the scannable code. If the scanning is done by the user who assigned the content, the user can be given a prompt to view or edit the content they assigned to the scannable code. If they want to edit the content, the user can go back and assign the content to the scannable code, at 68. If, on the other hand, they are satisfied with the content on the scannable code, the user can activate the scannable code, at 72. It is contemplated that once the user has selected the content for the scannable code and the scannable code has been activated, that the content can be locked-in or otherwise permanently saved to the scannable code. In other words, once the user finished the activation of the scannable code, the content cannot be changed by scanning the scannable code again. As such, the if the scannable code is scanned again (e.g., by a recipient of the scannable code), the content (e.g., the second response) will be displayed and not a prompt to upload/reupload content. As such, the activation of the scannable code means that the content on the scannable code will be displayed to a user if the user were to scan the now-activated scannable code. It is further contemplated, however, that the original user of the scannable code can edit or reupload the content after activating the scannable code. As a non-limiting example, the user can scan the scannable code after activating the scannable code to edit the content on the scannable code. The unique identifier assigned to the scannable code, for example, can recognize the user or the user's device (e.g., an IP address of the unique device) and give the option to edit the content on the scannable code after the scannable code has been activated. When an unrecognized user device or user scans the scannable code, however, only the content will be displayed. In other words, an unrecognized or unauthorized user or device cannot update the content on the scannable code after the scannable code has been activated. As a non-limiting example, the user can set up a personal account and the scannable code can be assigned to the personal account. As such, the user can access their personal account (e.g., by scanning the scannable code, opening an application on their device, or going to a webpage) in order to edit the content on the activated scannable code.

Figure 15:
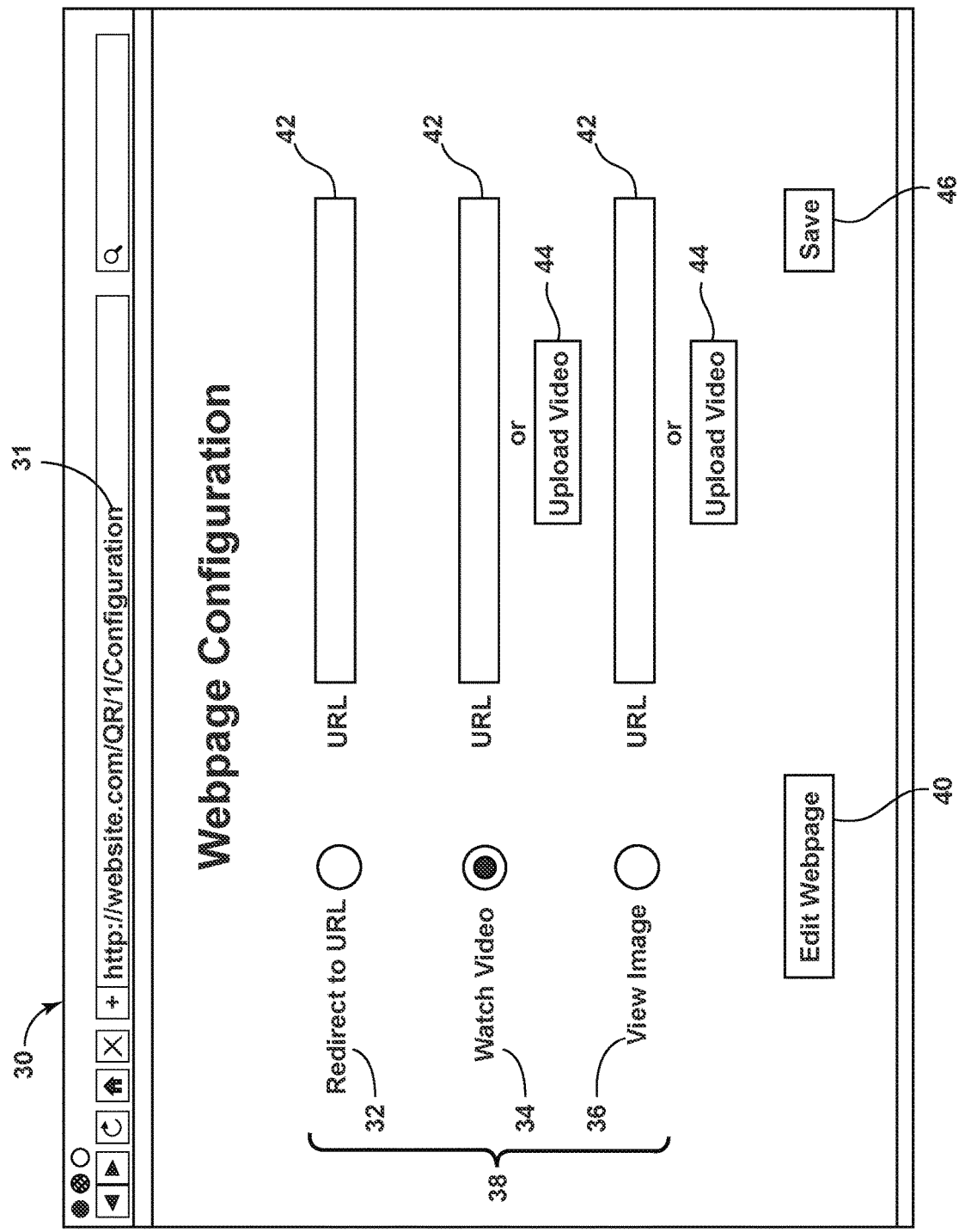
FIG. 15 is an illustration of a webpage allowing a user to define and configure the content linked to the scannable code of FIG. 4, the scannable code being absent of user defined content.

FIG. 15 is an illustration of an ordering webpage 80 that allows a user to customize the scannable code of FIG. 4 before ordering. The ordering webpage 80 corresponds to a URL 82 hosted on a service provider's servers. Here, the user may choose the number of scannable codes having a unique URL 27 and the numbers of copies of the scannable codes having that same unique URL 27 that are desired to be purchased. The user may select from a plurality of layouts 94 which may be edited by the user by selecting an edit function 90. The user may view a preview 92 of the layout of the scannable code after editing. It is contemplated that the webpage 80 can include a number of unique codes option 84, a number of copies option 86 and a sticker layout option 88, which can allow the user to select the number of codes per sheet, the number of copies of the sheet, and the layout of the sheet, respectively. The user may choose a print option 98 to print the purchased scannable code at home or a ship option 96 to ship the purchased scannable codes to a desired address. A user may also elect to have electronic copies electronically mailed or to download electronic copies of the scannable code. Users may review their current order 102, add multiple items 104 to the order 102 using an add to order function 100 and complete the order 100 using a complete order function 106. The ordering method described herein is an example and it will be understood that any method well-known in art of web based retail may be used. It is contemplated that the user can utilize the ordering webpage 80 to purchase a physical scannable code which has already been generated. The user can utilize the ordering webpage 80 to define the second response of the scannable code without having to physically scan the scannable code.

Layouts available having scannable codes may include but are not limited to stickers, labels, greeting cards, post cards, business cards, trading cards, playing cards, magnets, flower tags, pictures, picture frames, signs, books, envelopes, invitations, posters, flyers, stationary, clothing, gifts or any combination thereof.

Editable features of the layouts may include but are not limited to pictures, videos, text, sizes, colors, orientation, positioning, finish, and materials of construction or any combination thereof.

A method includes a user customizing and ordering a quantity of scannable codes from a service provider using a computing device. The scannable codes are encoded with a unique URL 27 corresponding to a unique webpage 26 hosted on the service provider's servers. The user scans the scannable codes to activate the scannable codes using a computing device comprising an imaging device and a scannable code reader such as a user device 24. Once activated, the user then customizes the unique webpage 26 corresponding to the unique URL 27 encoded in the scannable codes by defining the content on the unique webpage 26 using a computing device. The user then distributes the scannable codes to desired recipients. The recipients scan the scannable codes using a computing device comprising an imaging device and a scannable code reader such as a smartphone to access the unique webpage 26 containing the user's uploaded content or another webpage defined by the user.

A user purchase a quantity of premade scannable codes encoded with a unique URL 27 at a local retailer. The scannable codes may be manufactured by a service provider or a third party with predefined unique URL 27 encoded in the scannable codes which are printed on a variety objects such as stickers, labels, cards or other objects. The scannable codes may then be distributed to local retailers for purchase and use by a user. The user activates the scannable codes by scanning them with a computing device such as a user device 24. Once activated, the user may upload content such as video or images to the unique webpage 26 that corresponds to the unique URL 27. The user then distributes the scannable codes to desired recipients. The recipients scan the scannable codes using a computing device such as a smartphone 74 which directs the smartphone's browser to the unique webpage 26 containing the user's uploaded content.

Local retailers may offer packs of scannable codes in different quantities and layouts. For example, a local retailer may offer quantity of scannable codes ach having the same unique URL 27 encoded in each scannable code or a quantity of scannable codes each having a different unique URL 27 encoded in each scannable codes. The scannable codes may be printed on stickers, magnets, greeting cards or other predetermined materials of construction as disclosed herein. Upon purchase, the user may then activate the scannable codes and define the content linked to the scannable codes as described above.

The user may order a quantity of scannable codes encoded with a unique URL 27 from a service provider and may then print the scannable codes at home on a variety of materials.

A user may insert a scannable code encoded with a unique URL 27 into a document, e-mail or other electronic file by activating a key or icon on a computing device. Activating the key or icon automatically generates a scannable code encoded with a unique URL 27 and insert it into the electronic file. The user may then define the content linked to that scannable code.

Activating the key or icon on a computing device sends a signal to a computer software program, mobile application or a program add-in which initiates communication with the service provider's website to obtain a unique URL 27 to encode in the scannable code using an internet connection or mobile network. The computer software program, mobile application or a program add-in then generates a unique scannable code encoded with the unique URL 27 and inserts the scannable code into the electronic file.

A user may customize the layout of a scannable code, define the content linked to the scannable code, and purchase the scannable code from a service provider's website. The service provider may then ship physical scannable codes or electronically send digital scannable codes to user defined recipients for viewing the user defined content linked to the scannable code.

Figure 16:
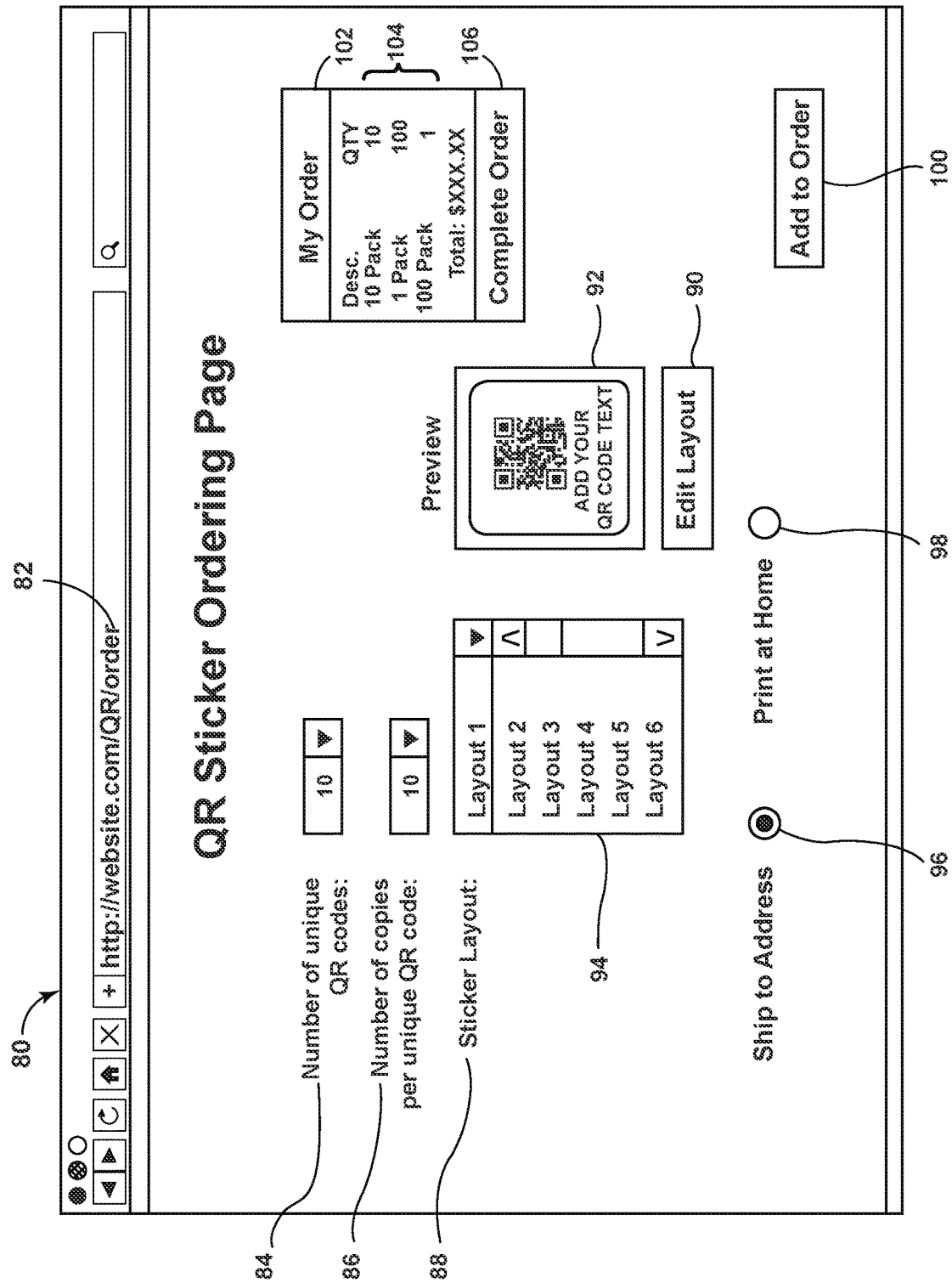
FIG. 16 is an illustration of a webpage which allows a user to customize and purchase the scannable code of FIG. 4.

FIG. 16 is a configuration webpage 30 that allows a user to define the content or final destination linked to the unique URL 27 encoded in the scannable code of FIG. 4. The configuration webpage 30 allows a user to define the function and contents of the unique webpage 26 corresponding to the unique URL 27. In other words, the configuration webpage 30 allows a user to define the second response. The configuration webpage 30 may correspond to a URL 31 or the unique URL 27. The user may choose from a plurality of options regarding the content linked to the scannable code. As a non-limiting example, the configuration webpage 30 can include of a plurality of radio buttons 38 or the like that allow the user to select between different options regarding the final content linked to the scannable code. For example, the user could choose between redirecting to a different URL 32, displaying a video 34 or displaying an image 36. Once an option is selected, the user may then provide a URL 42 linked to a video or image or upload 44 a video or image directly to the unique webpage 26 corresponding to the unique URL 27 encoded in the scannable code. Other user defined content options may include but are not limited to sound recordings, text or interactive content such as questionnaires, quizzes or games. User defined content on the unique webpage 26 is stored and hosted service provider's servers utilizing the web space corresponding the unique URL 27 encoded in the scannable code. In other words, the second response is defined by the user and stored on or otherwise becomes accessible to the unique URL 27.

The user may also have the option of customizing the unique webpage 26 corresponding to the unique URL 27 encoded in the scannable code by selecting an editing feature 40 on the configuration webpage 30. Examples of customizable features of the unique webpage may include but are not limited to adding/editing a background layout, colors, borders, graphics, sounds, animations, text, videos, images or any combination thereof.

The configuration webpage 30 may also be equipped with a save function 46 that allows a user to save changes made to the webpage 26 at any time. Furthermore, the user may edit the unique webpage 26 at any time.

To edit the unique webpage 26, a user may be required to choose that option on the unique webpage 26. The unique webpage 26 may request the user to sign in using account information such as a username and password associated with the service provider's website. Once signed in, the service provider's website may have a list of all activated scannable codes associated with that user's account. The user may then select the unique webpage 26 that is to be edited. The service provider may also recognize the user's computing device used to scan the scannable code and automatically allow the user to edit the unique webpage 26 when the user scans the scannable code.

Figure 17:
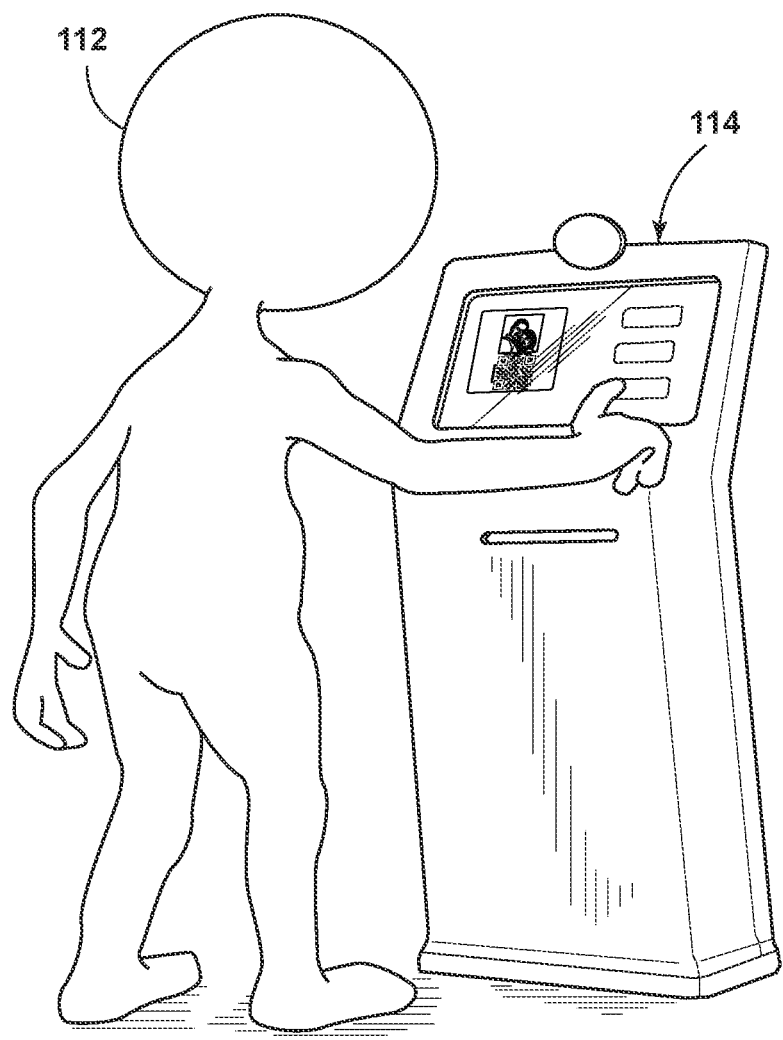
FIG. 17 is an illustration of a scannable code generating kiosk used to generate the scannable code of FIG. 4.

FIG. 17 is an illustration in which a user 112 may purchase and print customized scannable code as well as define the content on the unique webpage 26 corresponding to the unique URL 27 encoded on each scannable code at a kiosk 114. The user 112 may use a media storage device to upload content to the unique webpage 26 corresponding to the unique URL 27 encoded in the scannable code as described above. The kiosk 114 may also be connected to the internet so that the user 112 may also be able to define content linked to the scannable code or on the scannable code itself, by uploading content from the internet. The kiosk may have software provided from the service provider to facilitate uploading and editing content to the scannable code and the unique webpage 26 linked to the scannable code. Once uploaded, the user defined content will be stored on the web space corresponding to the unique URL 27 encoded in the scannable codes hosted by the service provider's servers and may be accessed and edited by the user 112 at any time.

In yet another embodiment, the service provider may offer a computer software program or mobile application for use on a computing device such as a smartphone or a personal computer for performing various operations relating to this invention. The software program or mobile application may include but is not limited to, a QR reader for scanning the QR codes 22, a means to upload and edit content linked to the QR codes 22, a means to edit the layout of the unique webpage 26 linked to the QR codes 22 a means to view and edit all purchased QR codes 22 and content link thereto, a means to upload content, customize the layout and order new QR codes 22 and a means to view which QR codes 22 have been scanned by recipients.

Figure 18:
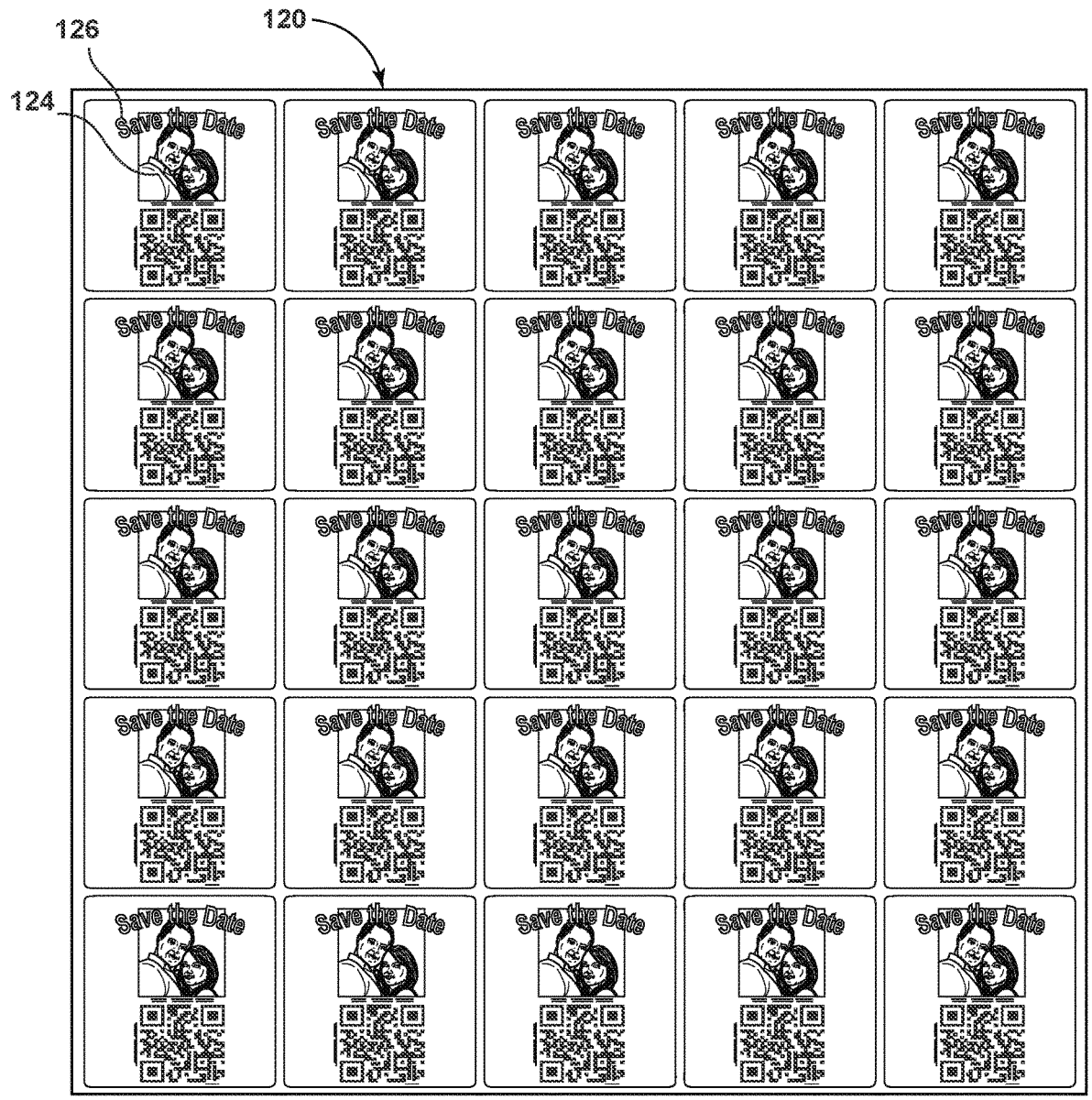
FIG. 18 is an illustration of a quantity of customized scannable code stickers including the scannable code of FIG. 4.

FIG. 18 is an example of a sheet containing customized scannable code stickers 120, including at least one scannable code of FIG. 4. the scannable code stickers 120 include a plurality of scannable codes with each having the same unique URL 27 encoded in each scannable code. The stickers are customized with a user defined photo 124 uploaded and edited by the user as well as text 126 entered an edited by the user. The scannable code stickers 120 are ready to be activated and to have content uploaded to the unique webpage 26 corresponding to the unique URL 27 encoded in each scannable code as described above. It will be appreciated that the scannable code stickers 120 can be defined as a memento as described herein.

As a non-limiting example, a user may decide to order twenty-five scannable code stickers 120 each having the same unique URL 27 encoded in the scannable code. It will be appreciated that there can be any number of one or more scannable codes per sheet of scannable code stickers 120. The user then chooses a sticker layout that includes user defined text 126 and a user defined photo 124. The user uploads the user-defined photo 124 and then crops and positions the user-defined photo 124 in the layout. The user then enters the desired text 126 in the chosen font and color. The user then chooses the adhesive and finish of the sticker. Finally, the user adds the scannable code stickers 120 to the order, enters the shipping information and purchases the scannable code stickers 120.

The user may then receive a sheet containing twenty-five scannable code stickers 120 containing the user defined photo 124 and text 126 as shown in FIG. 10. The user then scans one of the scannable code on the scannable code stickers 120 using a user device 24 which directs a user to an activation page on the service provider's website. The user activates the scannable code by entering account information such as a username and password. By activating one QR code 22, all other scannable codes encoded with the same unique URL 27 are also activated. After activation, the user may access the unique webpage 26 corresponding to the unique URL 27 encoded in the scannable code directly on the user device 24. The user may also sign into the service provider's website using a different computing device without scanning the scannable code by entering account information such as a username a password. The user may then select the scannable code associated with the users account to access the unique webpage.

The unique webpage 26 may then be customized by the user using a user device 24 or other computing device as described above. The user may choose to upload a video, picture or other content that is desired to be linked to the scannable codes. Once uploaded, the user saves the webpage at which point the unique webpage 26 is considered defined.

After the unique webpage 26 is customized with the user defined content, the user may attach the scannable code stickers 120 to a desired memento such as a postcard. The user may then distribute the postcards containing the scannable code stickers 120 to desired recipients. Upon receipt of the post cards, the recipients may then scan the scannable codes on the scannable code stickers 120 using a smartphone 74. The smartphone 74 may then atomically display the user defined content on the unique webpage 26 corresponding to the unique URL 27 encoded in the scannable code hosted on the service provider's servers.

Figure 19:
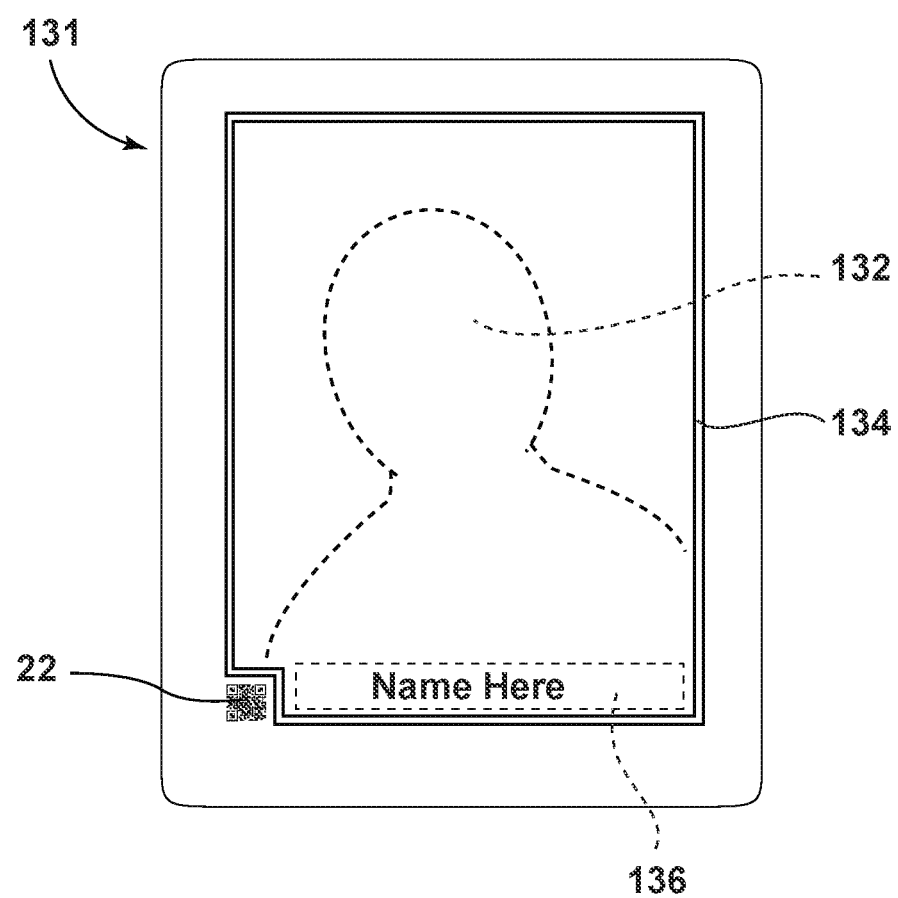
FIG. 19 is an illustration of a border template having the scannable code of FIG. 4 encoded with a unique URL to combine images with other digital content.

FIG. 19 is an illustration of an example of a border template 131 layout having the scannable code of FIG. 4 encoded with a unique URL 27. Using this border template 131 layout, a user may combine an image 132 with digital content linked to the unique webpage 26 corresponding to unique URL 27 encoded in the scannable code. A user may upload and edit an image 132, add and edit text 136 and choose from a plurality of borders 134. A user may then activate the scannable code and define the content linked to the scannable code as described above.

Using a border template 131, QR codes 22 may be attached to items such as photographs, trading cards, playing cards, signs, picture frames, flower tags, stationary or any other object comprising an image.

As another example, but not by way of limitation, a user may decide to order 10 scannable codes each having a different unique URL 27 encoded in the scannable code. The user chooses a 5"×7" photo having a border template 131 layout for all ten scannable code. The user may then upload up to ten photos and may then crop and position the photos in the layout using photo editing software. The user then chooses the size and location of the scannable code on the photos using a scannable code border template 131. The user then chooses the material of construction and the finish of the scannable code photo. Finally, the user adds the customized scannable code photos to the order, enters the shipping information and purchases the pictures containing the scannable codes. The user may perform these actions at the service provider's website, at a kiosk, or using software provided by the service provider.

After receiving the pictures containing the scannable codes, the user scans each scannable code having a different unique URL 27 with a user device 24 to activate each scannable code as described previously. After activation, the user may upload a video or other content to link to the scannable codes on the pictures as described previously. The user may then distribute the scannable codes to recipients for viewing of the content as described previously.

As yet another example, but not by way of limitation, a user may purchase a greeting card at a local retailer containing scannable code having a unique URL 27 encoded in the scannable code corresponding to a unique webpage 26 on a service provider's website. The user activates the scannable code by scanning the scannable code with a user device 24. The user then uploads content, for example, a recording of the user singing happy birthday to a recipient. The user then gives the greeting card to the recipient. The recipient may then scan the scannable code using a smartphone 74 to listen to the recording.

As other examples, and not by way of limitation, a user may attach a scannable code to a sports card which once scanned plays highlights relating to the sports card. A user may attach a scannable code to a photo which once scanned, plays a video of when the photo was taken. A user may attach a scannable code to an anniversary card which once scanned plays a heartfelt recording. A user may attach a scannable code to a wedding save the date invitation which once scanned, displays information regarding the wedding. A user may attach a scannable code to a postcard which once scanned displays photographs and video from a vacation. A user may insert a scannable code into a report or document which once scanned, displays content related to the report or document.

The scannable codes as described in the invention have almost limitless applications to enhance social communication. By providing a web based system, computer software, mobile application or interactive kiosk that allows users to easily share content of their choosing linked to scannable codes printed on a variety of materials; users may now attach easily accessible digital content to physical objects.

Computing devices may be used to perform a plurality of operations relating to this invention. Computing devices may include, but are not limited to, processors, input/output devices, networking means, and memory having programs stored therein. It will be understood that a computing device can be in the form of a desktop, notebook or laptop, a mainframe, personal digital assistant (PDA), tablet or netbook, smartphone, interactive kiosk, a server, workstation, minicomputer, microcomputer or any other suitable form of computing device to perform operations of this invention as described herein.

Benefits of the present disclosure include a system and a method for a scannable code that can be dynamically updated when compared to a conventional scannable code. For example, a conventional scannable code relies on being assigned an identifier when the conventional scannable code is generated. This identifier includes a set of pre-existing loadable data that cannot be changed after the conventional scannable code has been generated. In other words, the set of loadable data that will appear once the conventional scannable code is scanned, is determined when the conventional scannable code is generated. The scannable code as described herein, however, does not include the pre-existing set of loadable data when the scannable code is assigned the unique identifier and generated. As such, the scannable code, after it is generated and assigned the unique identifier, can be defined as a blank scannable code that once scans will direct a user to a web-page, app, or prompt to add their own, user-defined loadable data to the scannable code. As such, the content of the scannable code (e.g., the set of loadable data) can be dynamically updated after the generation of the scannable code. Further yet, the scannable code can allow for a user to change the set of loadable data even after the scannable code is activated. As such, the scannable code as described herein can be dynamically updated, thus presenting a clear advantage over the conventional scannable code that cannot be dynamically updated.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A memento comprising:
a scannable code having a unique identifier representative of a unique location on a computer network with the unique location having a first response with a first set of data, wherein the scannable code is configured to be:
scanned a first time, via a first scanner associated with a first interface, causing the first response to be displayed through the first interface;
wherein the first response includes a prompt to upload a second set of data at least
partially different from the first set of data, and and generate a second response including at least a portion of the second set of data; and
wherein the first response is replaced by the second response upon generation of the second response such that subsequent scanning of the scannable code will display at least a portion of the second set of data.

2. The memento of claim 1, wherein the memento is one of a magnet, a bowtie, a vase, a sticker, or a cup.

3. The memento of claim 1, wherein the scannable code is one of either a QR code or an NFC tag.

4. The memento of claim 1, wherein upon the generation of the second response, the first response is automatically removed from the unique location such that subsequent scanning of the scannable code by a device different from the first scanner will display the second response.

5. A method of providing a providing configurable access to a set of loadable data associated with a scannable code, the method comprising:
generating a unique identifier and the scannable code associated with the unique identifier, the unique identifier being representative of a unique location on a computer network and including a first response having a first set of data;
receiving, at the unique location, an upload of a second set of data, the second set of data being uploaded through a prompt of the first response; and
replacing the first response with a second response having at least a portion of the second set of data;

wherein generating the unique identifier and the scannable code happens prior to receiving the second set of data.

6. The method of claim 5, further comprising placing the scannable code on a memento, wherein the memento is one of a card, a magnet, a bowtie, a vase, a sticker, or a cup.

7. The method of claim 5, further comprising:
editing the second response by receiving a third set of data; and
replacing the second set of data with the third set of data.

8. The method of claim 5, further comprising displaying, through an interface associated with a scanner configured to scan the scannable code, one of either the first response or the second response, wherein the second response is only displayed after receiving the second set of data.

9. A scannable code comprising:
a unique identifier representative of a unique location on a computer network with the unique location having a first response with a first set of data, wherein the scannable code is configured to be:
scanned a first time, via a first scanner associated with a first interface, causing the first response to be displayed through the first interface;
wherein the first response includes a prompt to upload a second set of data at least partially different from the first set of data, and generate a second response including at least a portion of the second set of data; and
wherein the first response is replaced by the second response upon generation of the second response such that subsequent scanning of the scannable code will display at least a portion of the second set of data.

10. The scannable code of claim 9, wherein the scannable code is a physical scannable code provided on a physical memento.

11. The scannable code of claim 9, wherein the scannable code is a digital scannable code.

12. The scannable code of claim 9, wherein the scannable code is configured to be scanned a second time, after the first time and via a second scanner different from the first scanner, causing the second response to be displayed through the second scanner.

13. The scannable code of claim 9, wherein the scannable code is configured to be scanned a second time, after the first time and via the first scanner, causing an option to edit the second response to be displayed through the first interface.

14. The scannable code of claim 13, wherein the second response is edited to include a third set of data replacing the second set of data.

15. The scannable code of claim 9, wherein the second set of data includes at least one of a video, a picture, a link, a message, a non-fungible token, or a sound.

16. The scannable code of claim 9, wherein the first response is a pre-loaded response that is not defined by a user of the first scanner.

17. The scannable code of claim 9, wherein the second response is a user-associated response that is defined by a user of the first scanner.

18. The scannable code of claim 9, wherein the first response is one or more prompts prompting a user to upload the second set of data.

19. The scannable code of claim 9, wherein the unique identifier is a unique Uniform Resource Locator (URL).

20. The scannable code of claim 9, wherein the scannable code is one of a Quick Response (QR) code, a Near Field Communication (NFC) tag, a High Capacity Color Barcode (HCCB), a High Capacity Color 2-Dimensional Barcode (HCC2DB), a snap tag, an Augmented Reality (AR) overlay, or an image.

* * * * *